(12) United States Patent
Noro et al.

(10) Patent No.: US 7,106,364 B1
(45) Date of Patent: Sep. 12, 2006

(54) CAMERA CONTROL SYSTEM

(75) Inventors: Hideo Noro, Tokyo (JP); Kazuko Suzuki, Yokohama (JP); Youichi Kazama, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/118,754

(22) Filed: Jul. 17, 1998

(30) Foreign Application Priority Data

Jul. 23, 1997 (JP) ............................................. 9-197020

(51) Int. Cl.
*H04N 5/232* (2006.01)
*H04N 7/14* (2006.01)

(52) U.S. Cl. ................................ 348/211.3; 348/14.05; 348/14.08; 348/211.1; 348/207.11

(58) Field of Classification Search ................. 348/211, 348/14.02, 14.03, 14.08, 14.05, 213, 211.3, 348/211.1, 14.09, 211.4, 211.5, 552, 207.1, 348/207.11, 211.6
See application file for complete search history.

(56) References Cited

U.S. PATENT DOCUMENTS

| | | | | | |
|---|---|---|---|---|---|
| 4,992,866 | A | * | 2/1991 | Morgan | 348/159 |
| 5,111,288 | A | * | 5/1992 | Blackshear | 348/143 |
| 5,583,796 | A | * | 12/1996 | Reese | 348/152 |
| 5,625,410 | A | * | 4/1997 | Washino et al. | 348/154 |
| 5,995,140 | A | * | 11/1999 | Cooper et al. | 348/212 |
| 6,002,995 | A | * | 12/1999 | Suzuki et al. | 348/211 |
| 6,122,005 | A | * | 9/2000 | Sasaki et al. | 348/211 |
| 6,133,941 | A | * | 10/2000 | Ono | 348/15 |
| 6,137,485 | A | * | 10/2000 | Kawai et al. | 348/211 |
| 6,239,836 | B1 | * | 5/2001 | Suzuki et al. | 348/211 |
| 6,567,121 | B1 | * | 5/2003 | Kuno | 348/211.3 |
| 2001/0033332 | A1 | * | 10/2001 | Kato et al. | 348/211 |
| 2002/0018123 | A1 | * | 2/2002 | Suzuki et al. | 348/211 |

FOREIGN PATENT DOCUMENTS

| | | |
|---|---|---|
| DE | 42 33 137 C1 | 1/1994 |
| EP | 0 734 157 A2 | 9/1996 |
| JP | 06-284323 | 10/1994 |
| JP | 08-317374 | 11/1996 |
| JP | 09-037358 | 2/1997 |

OTHER PUBLICATIONS

Patent Abstracts of Japan JP 05 219422 A, vol. 017, No. 665 published Aug. 27, 1993.

* cited by examiner

*Primary Examiner*—Andrew Christensen
*Assistant Examiner*—Lin Ye
(74) *Attorney, Agent, or Firm*—Cowan, Liebowitz & Latman, P.C.

(57) ABSTRACT

A camera server includes a video transmitting part for transmitting a video signal of a video camera to each of a plurality of camera clients in response to their request to acquire the control right of the video camera and their requests to transmit video information of the video cameras, a permission command issuring part for issuing a command to permit control of the video camera in response to the request to acquire the control right of the video camera, and an automatic control part for executing automatic control of the video camera if the command to permit control of the video camera is not issued.

93 Claims, 17 Drawing Sheets

FIG. 10
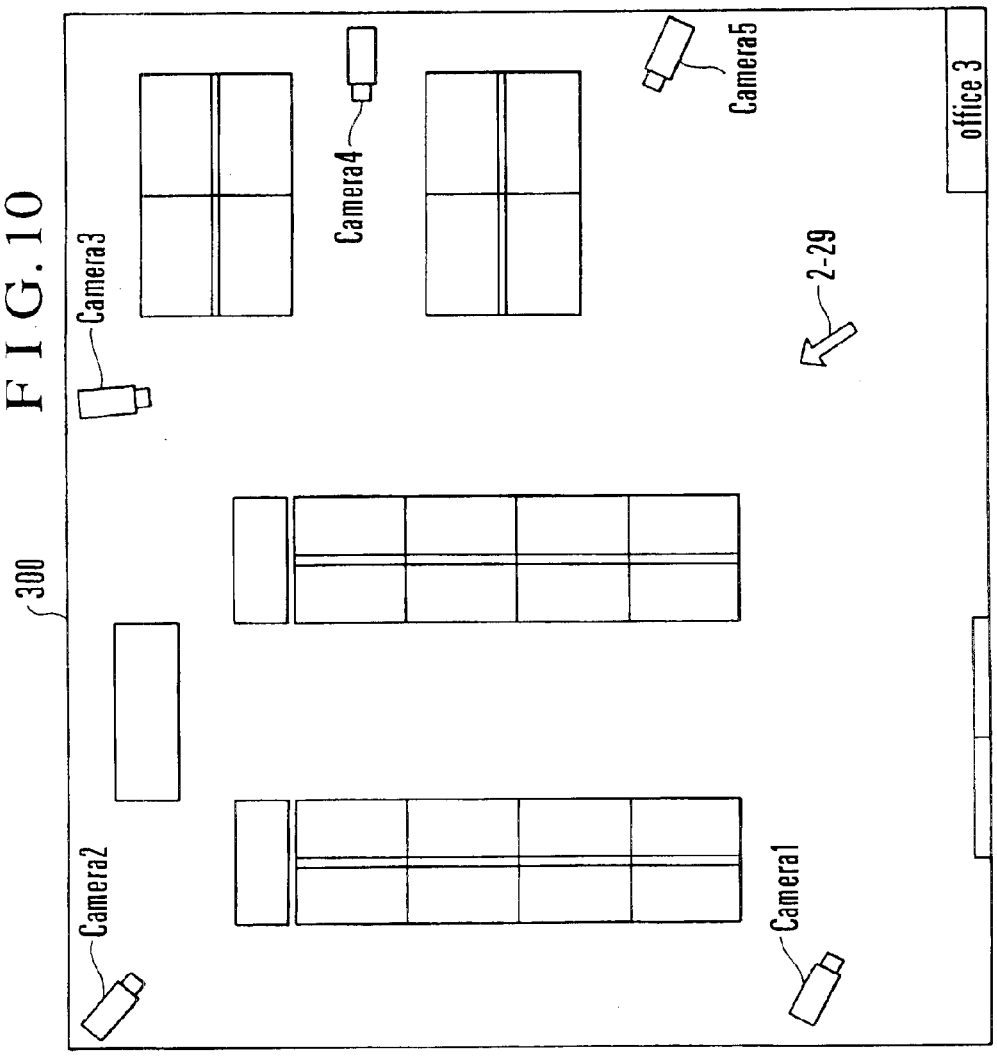
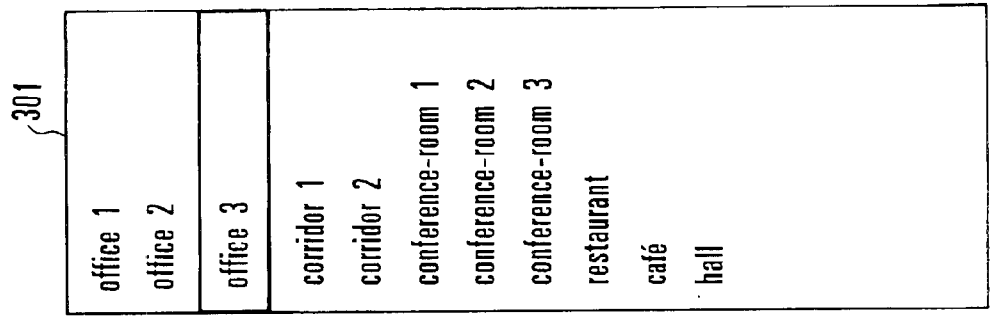

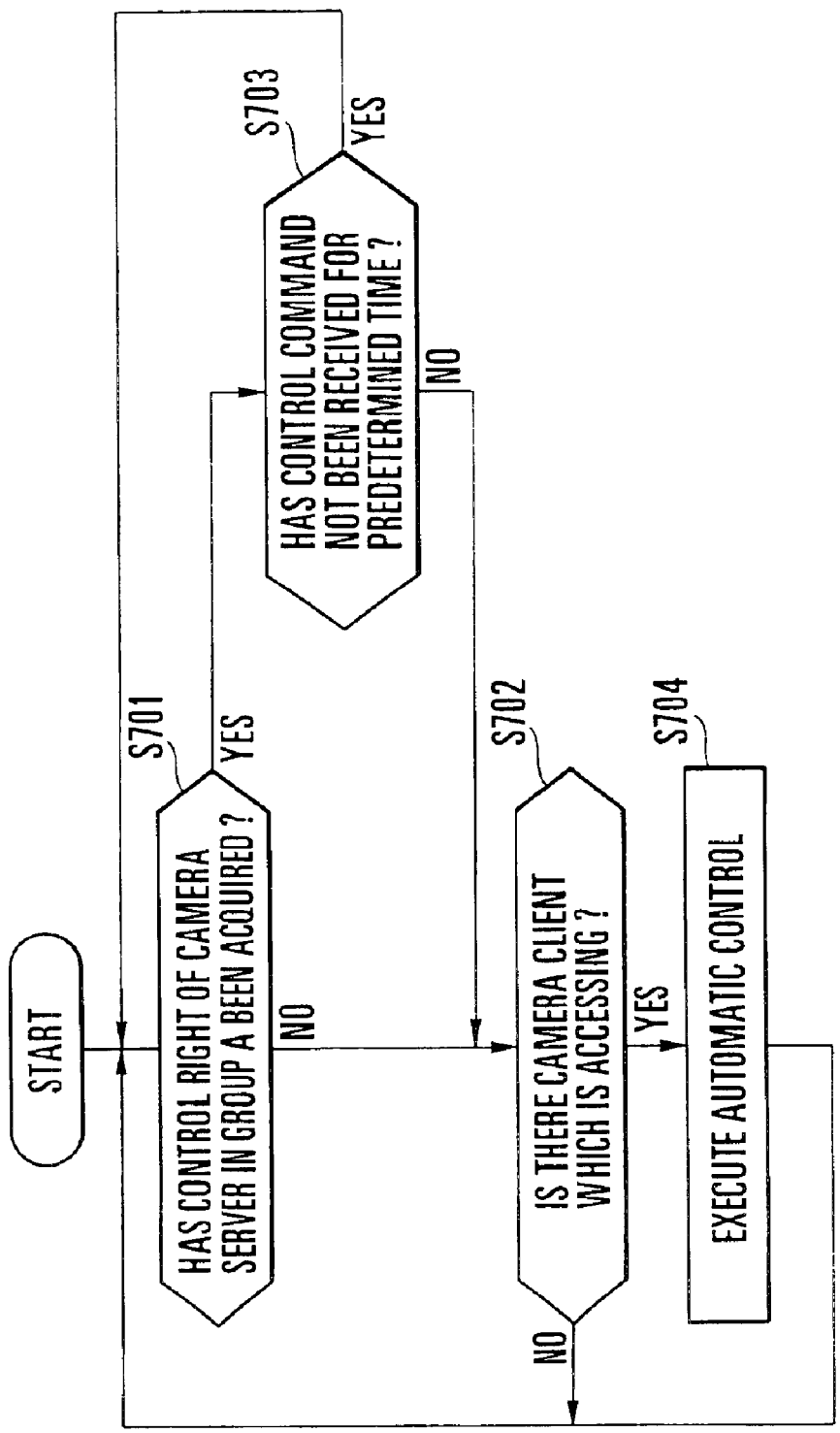

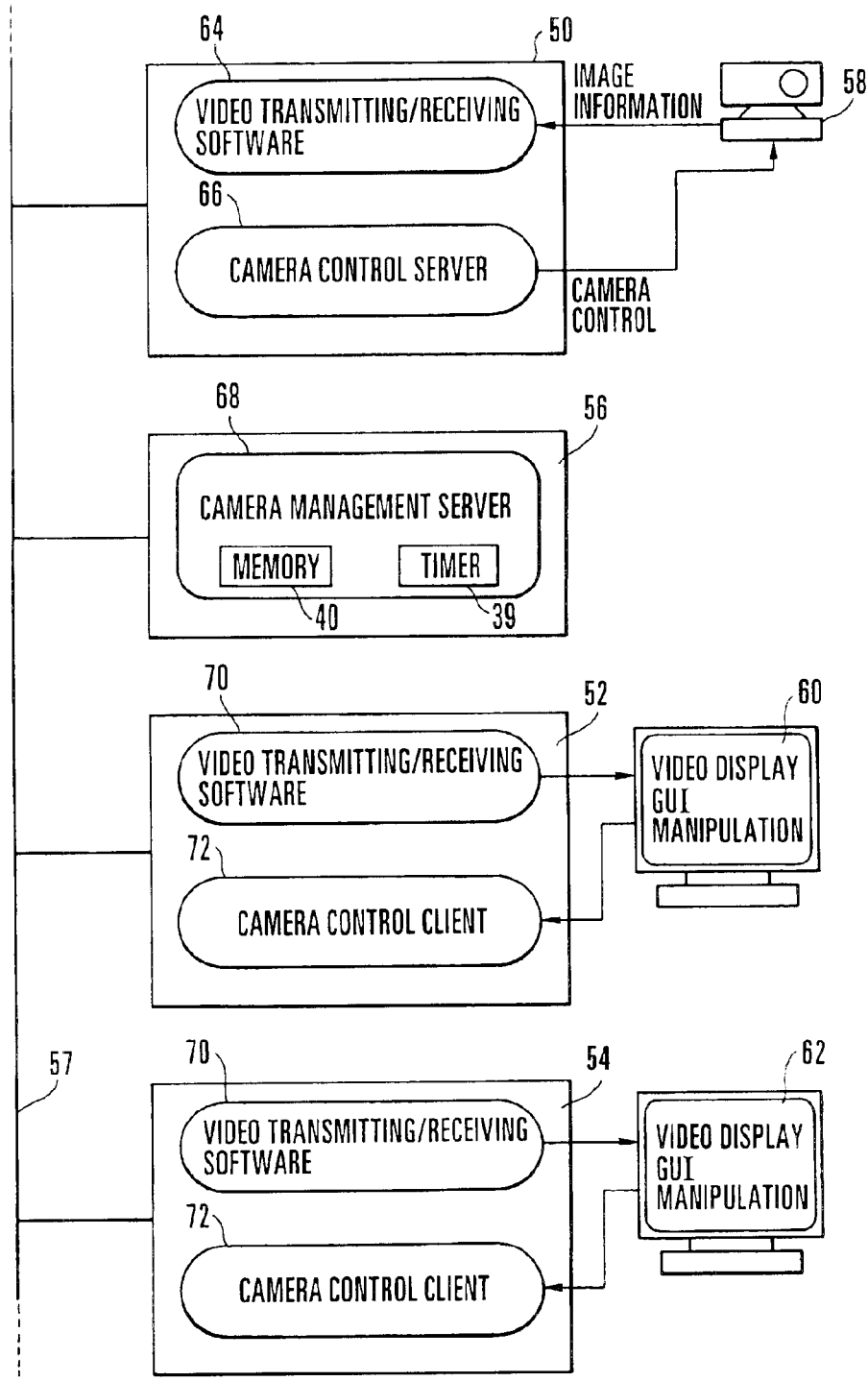

CAMERA CONTROL SYSTEM

BACKGROUND OF THE INVENTION

1. Field of the Invention

The present invention relates to a camera control system for remote control of a camera suitable for use in a video conference system, a surveillance camera system or the like.

2. Description of Related Art

For example, in a surveillance camera system or the like, if it is desired to check video images outputted from a plurality of cameras whose image pickup directions are controllable and which are connected to a network, only a client (computer terminal) having a control right can execute camera control.

However, if a client having a control right is not controlling a camera for some reasons or if no clients have the control rights of cameras which they are accessing, no camera control is executed so that a video image of no interest can only be picked up.

BRIEF SUMMARY OF THE INVENTION

In light of the above-described problem, an object of the present invention is to provide a camera control system capable of providing an appropriate video image even to a client having no control right.

Another object of the present invention is to provide a camera control system capable of appropriately displaying an image requested by a client during automatic control of a camera.

To achieve at least one of the above objects, in accordance with one aspect of the present invention, there is provided a camera control system capable of controlling a video camera from a plurality of computer terminals via a network, the camera control system comprising control means for controlling the video camera on the basis of a control command from one of the plurality of computer terminals, and automatic control means for executing automatic control of the video camera if the control command for the video camera is not received from any of the plurality of computer terminals.

In accordance with another aspect of the present invention, there is provided a camera control system which comprises control means for controlling a video camera, automatic control means for executing automatic control of the video camera if a control command for the video camera is not received from a computer terminal, a plurality of computer terminals for enabling the control means to output the control command for the video camera via a network, and the video camera controlled by the control means.

In accordance with another aspect of the present invention, there is provided a camera control system which comprises control method for a camera control system capable of controlling a video camera from a plurality of computer terminals via a network, the control method comprising a control step of controlling the video camera on the basis of a control command from one of the plurality of computer terminals, and an automatic control step of executing automatic control of the video camera if the control command for the video camera is not received from any of the plurality of computer terminals.

In accordance with another aspect of the present invention, there is provided a storage medium which stores therein a program for executing control over a camera control system capable of controlling a video camera from a plurality of computer terminals via a network, the program comprising processes of controlling the video camera on the basis of a control command from one of the plurality of computer terminals, and executing automatic control of the video camera if the control command for the video camera is not received from any of the plurality of computer terminals.

The above and other objects, features and advantages of the present invention will become apparent from the following detailed description of preferred embodiments of the present invention, taken in conjunction with the accompanying drawings.

BRIEF DESCRIPTION THE SEVERAL VIEWS OF THE DRAWING

Figure 4:
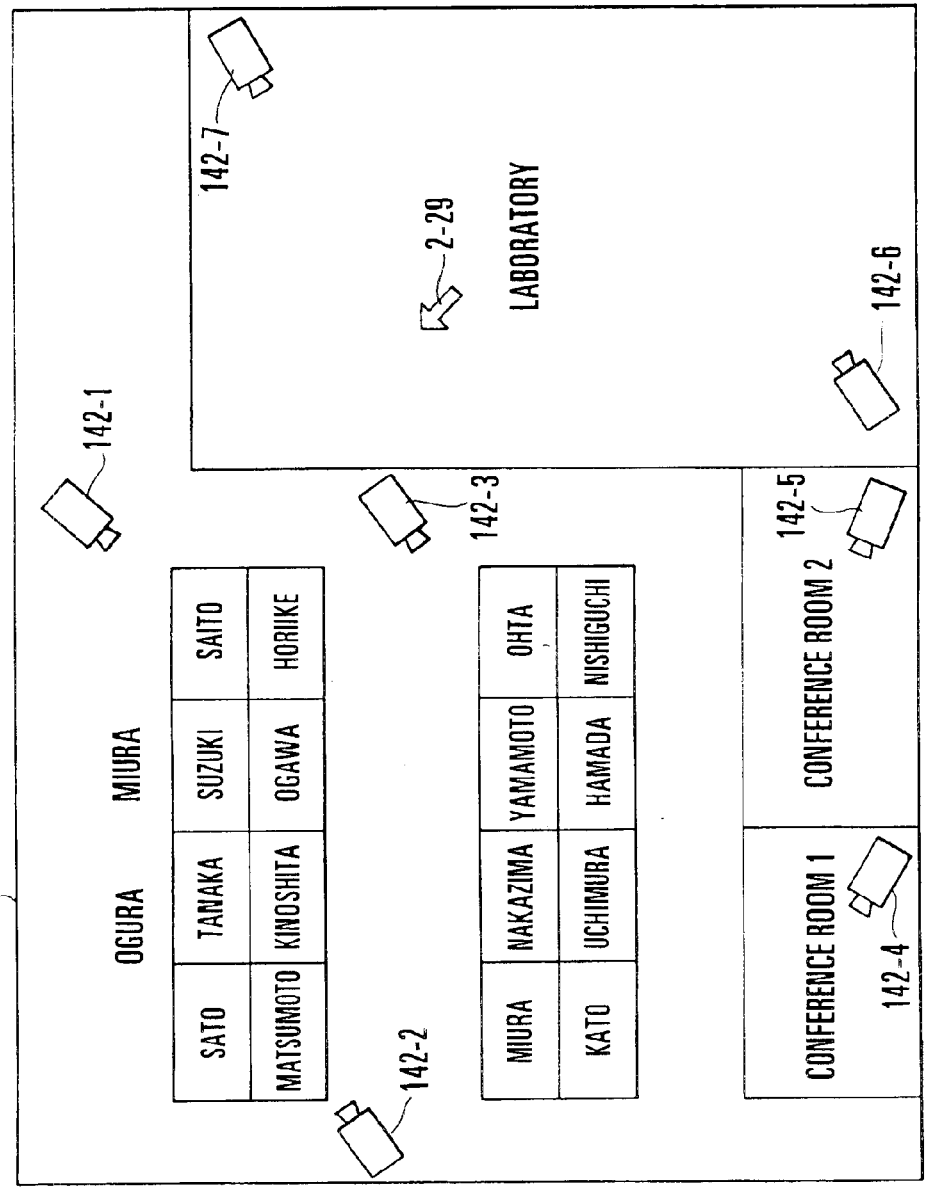
Figure 5:
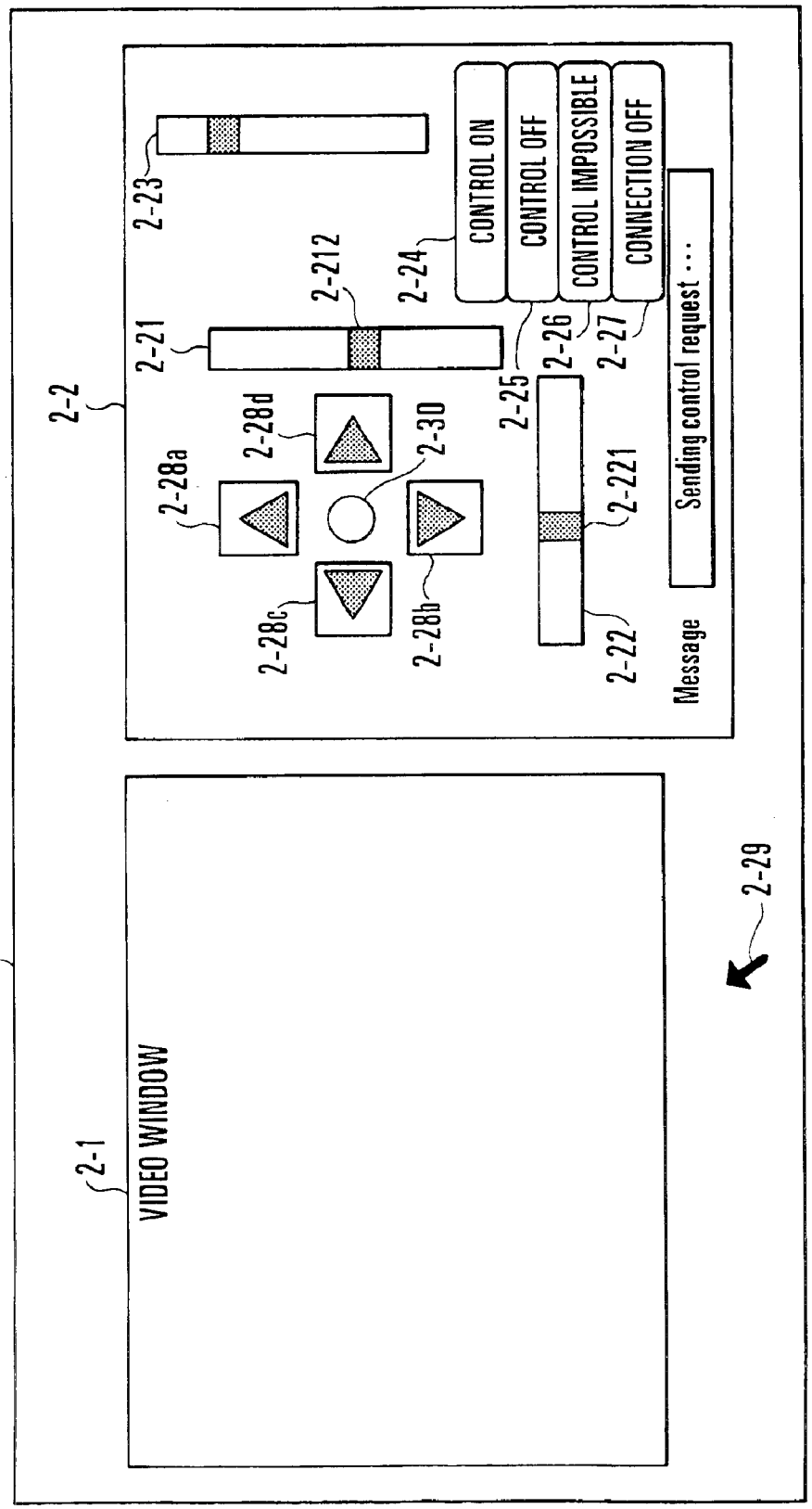
Figure 6:
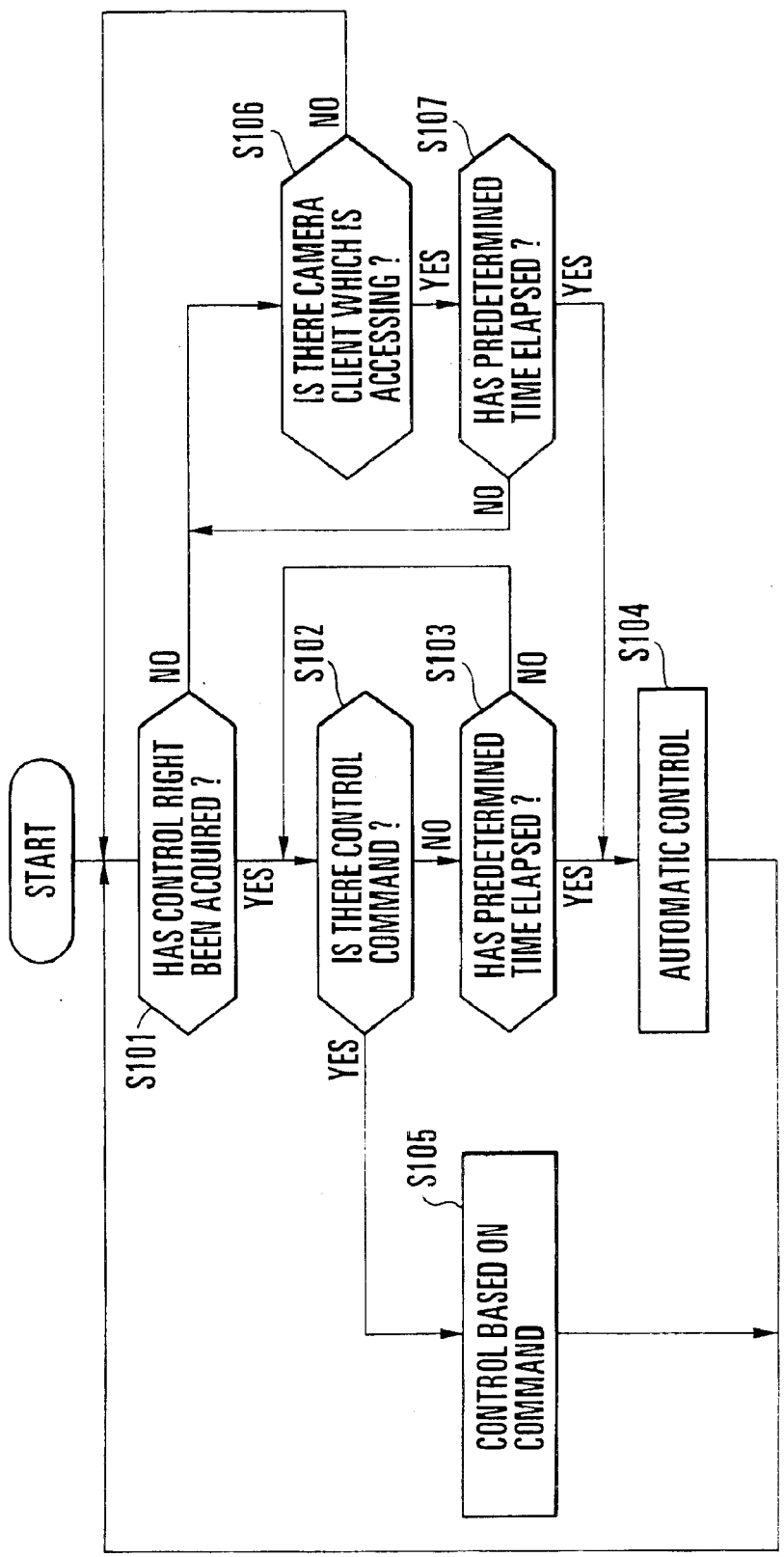
Figure 7:
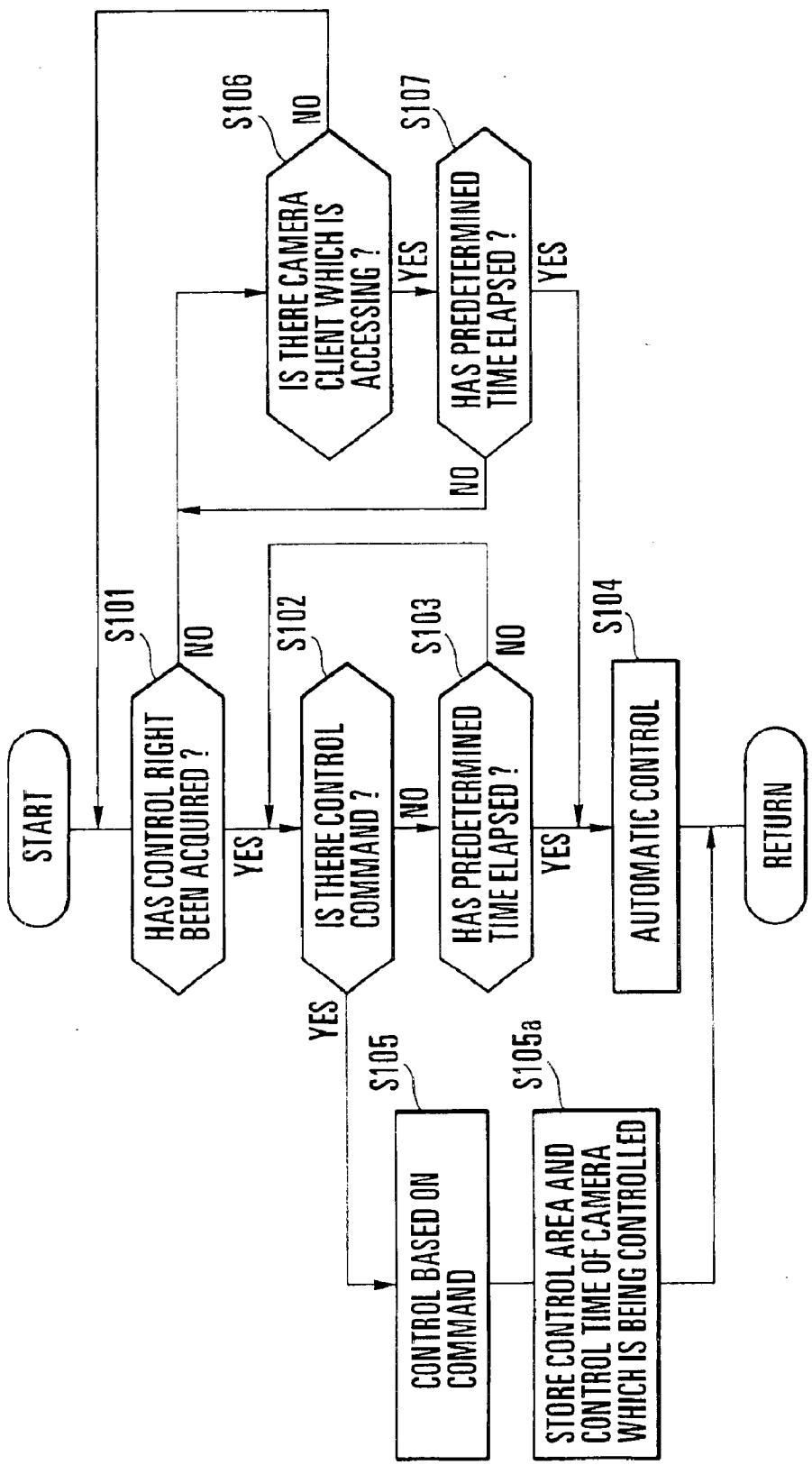
Figure 8:
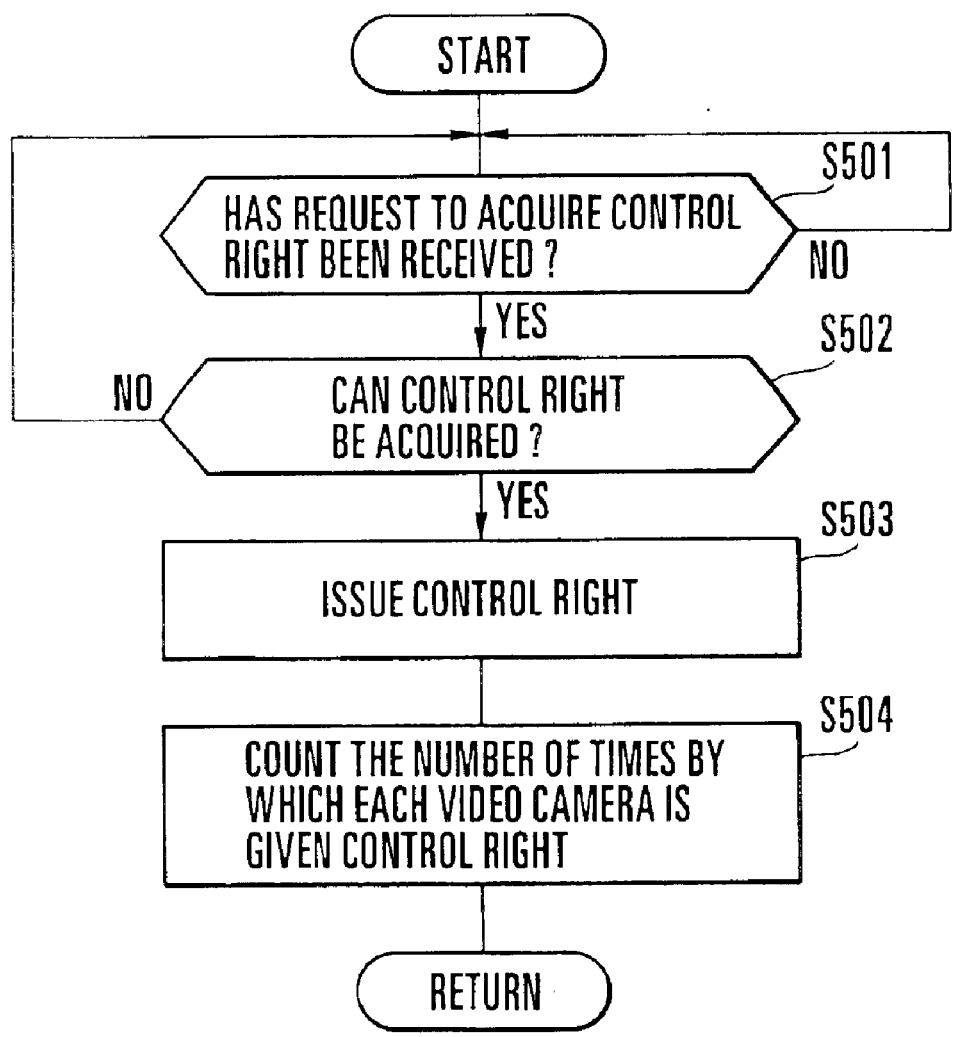
Figure 9:
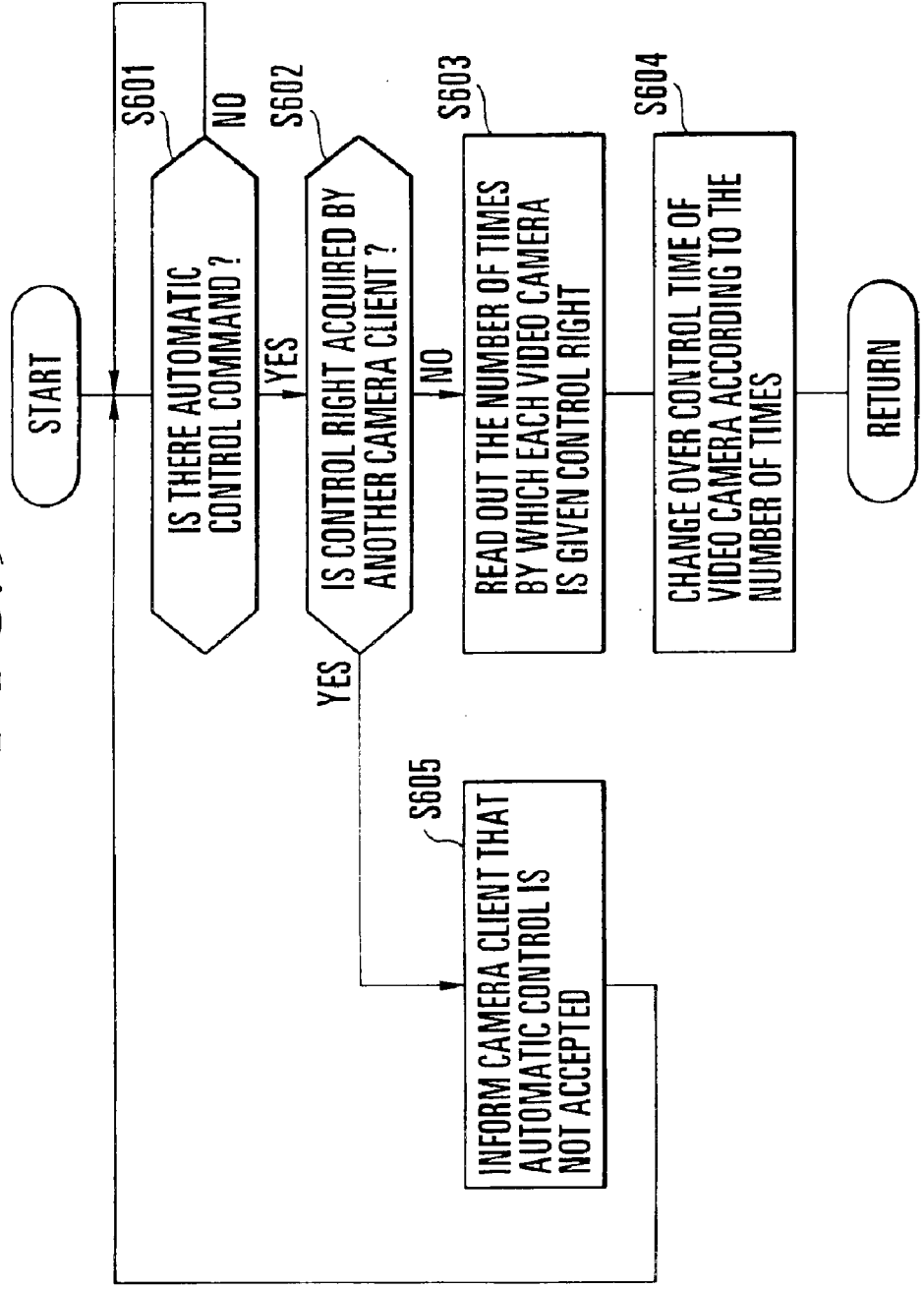
Figure 11:
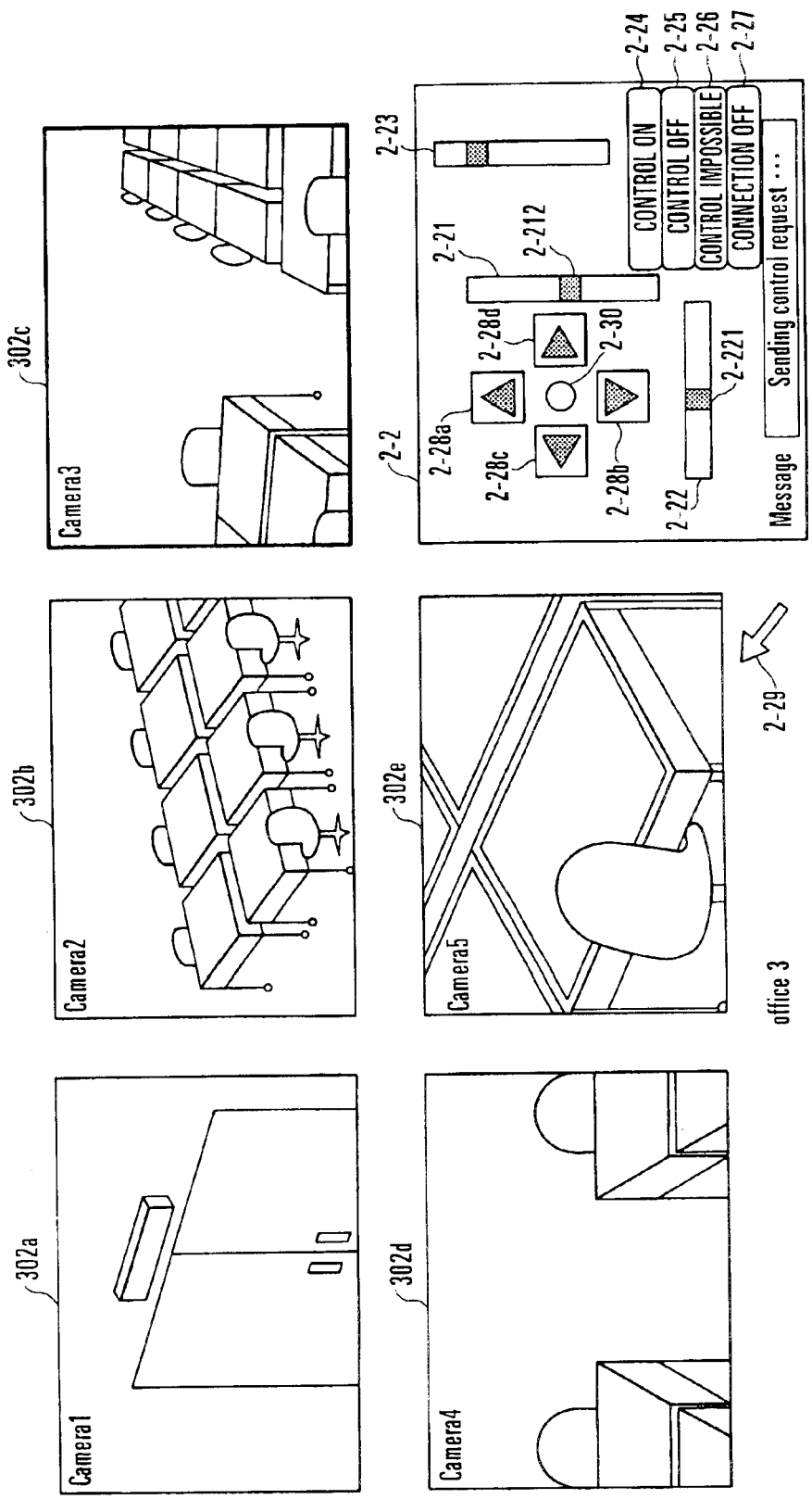
Figure 12:
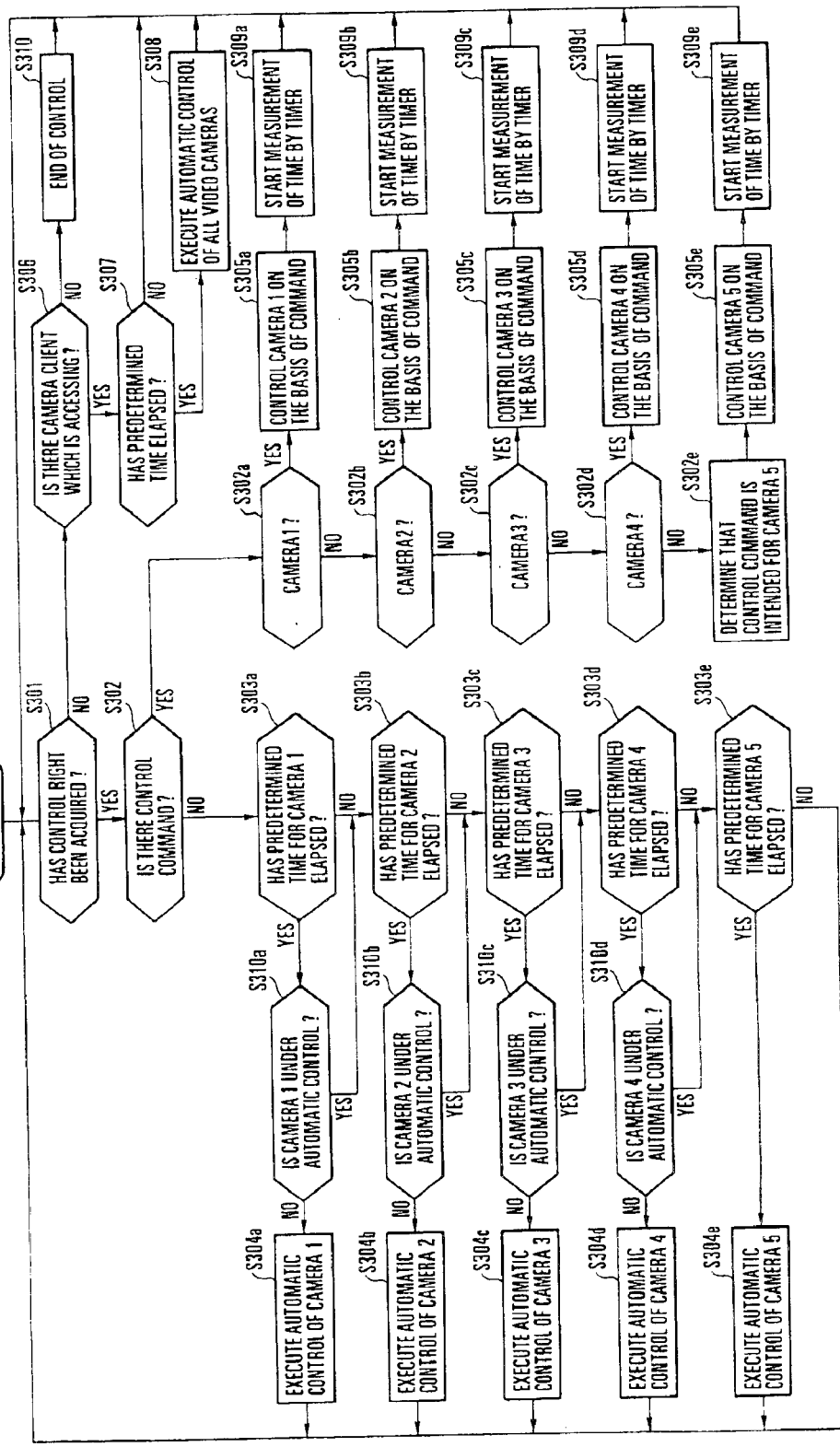
Figure 13:
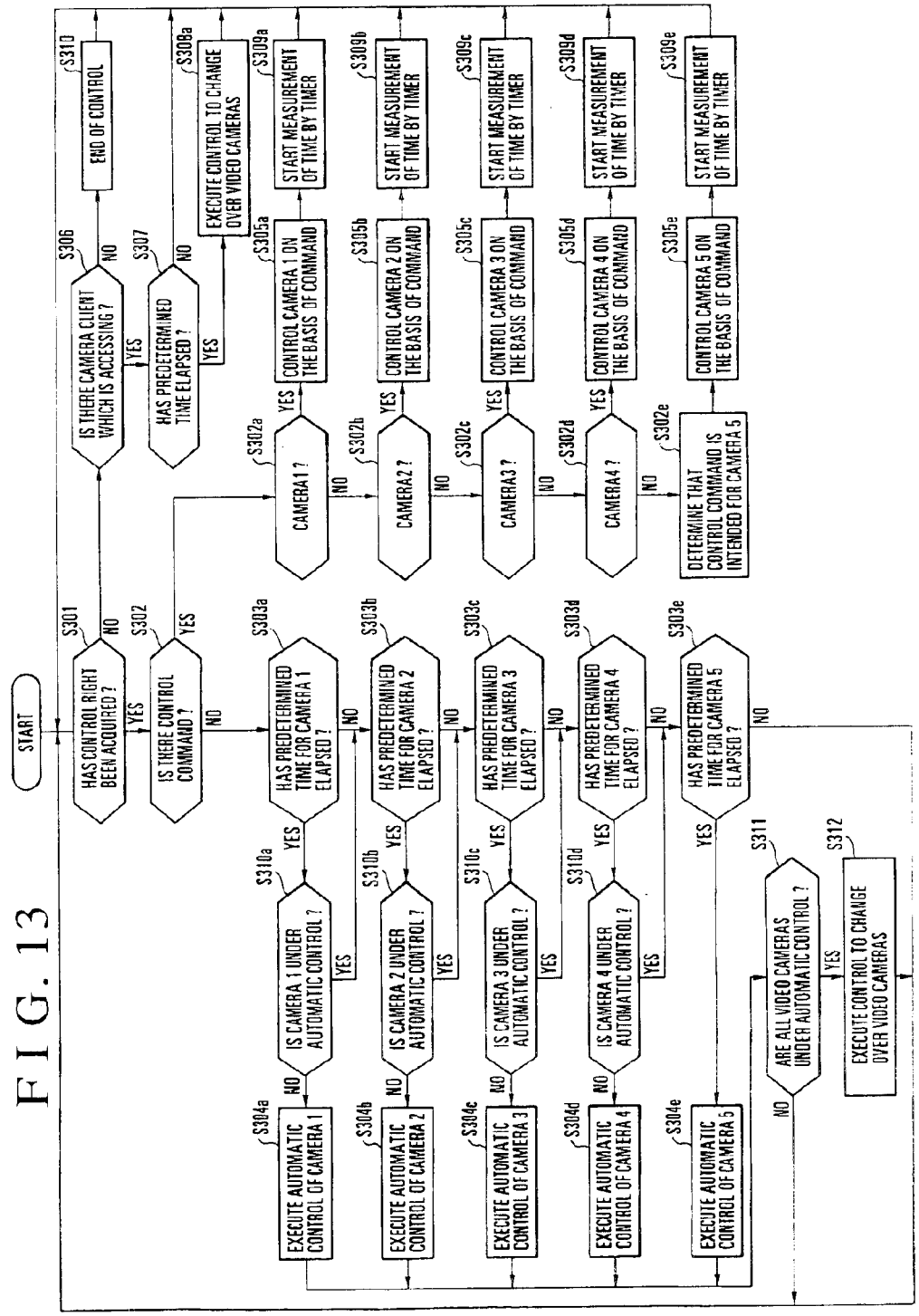
Figure 14:
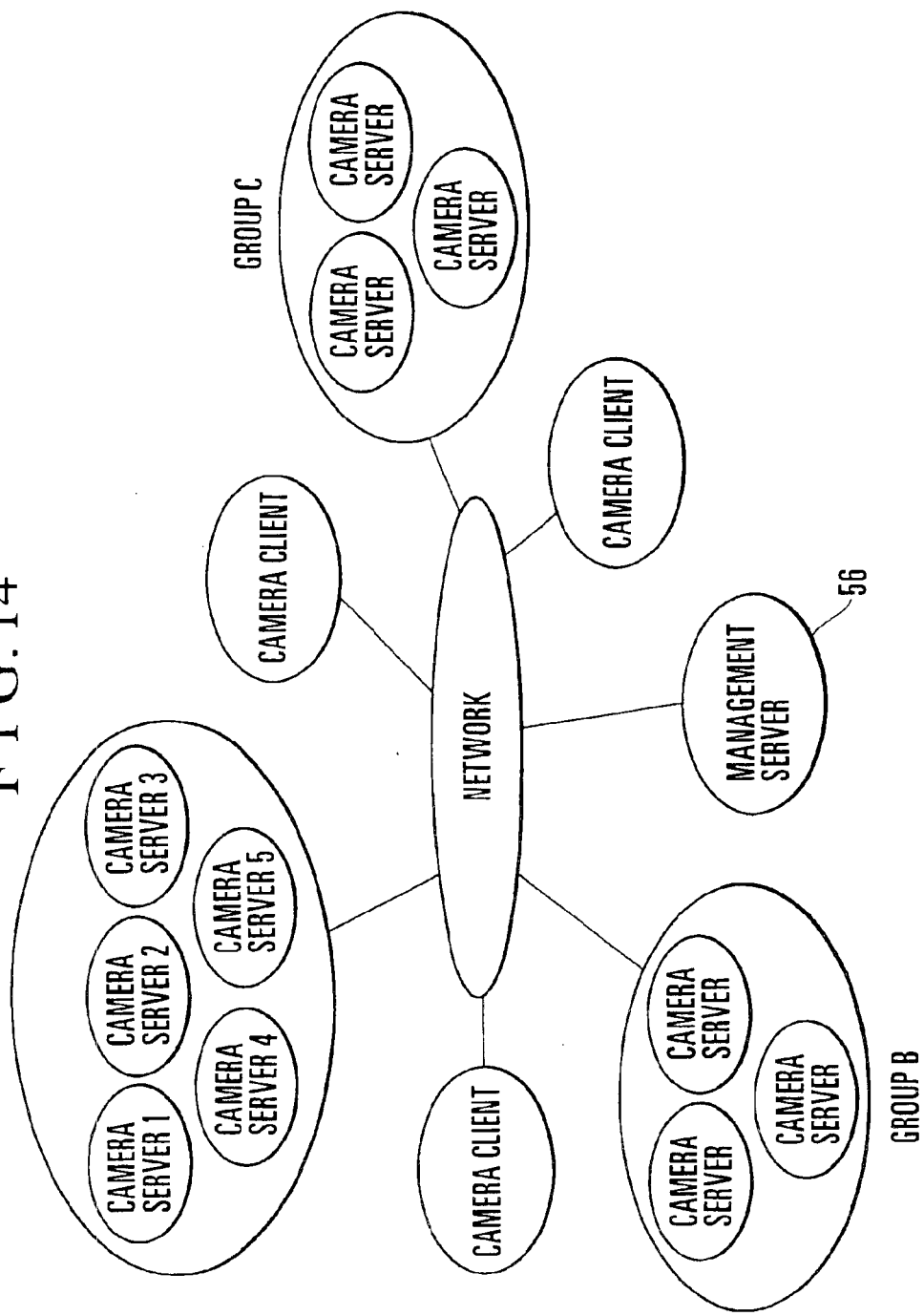
Figure 15:
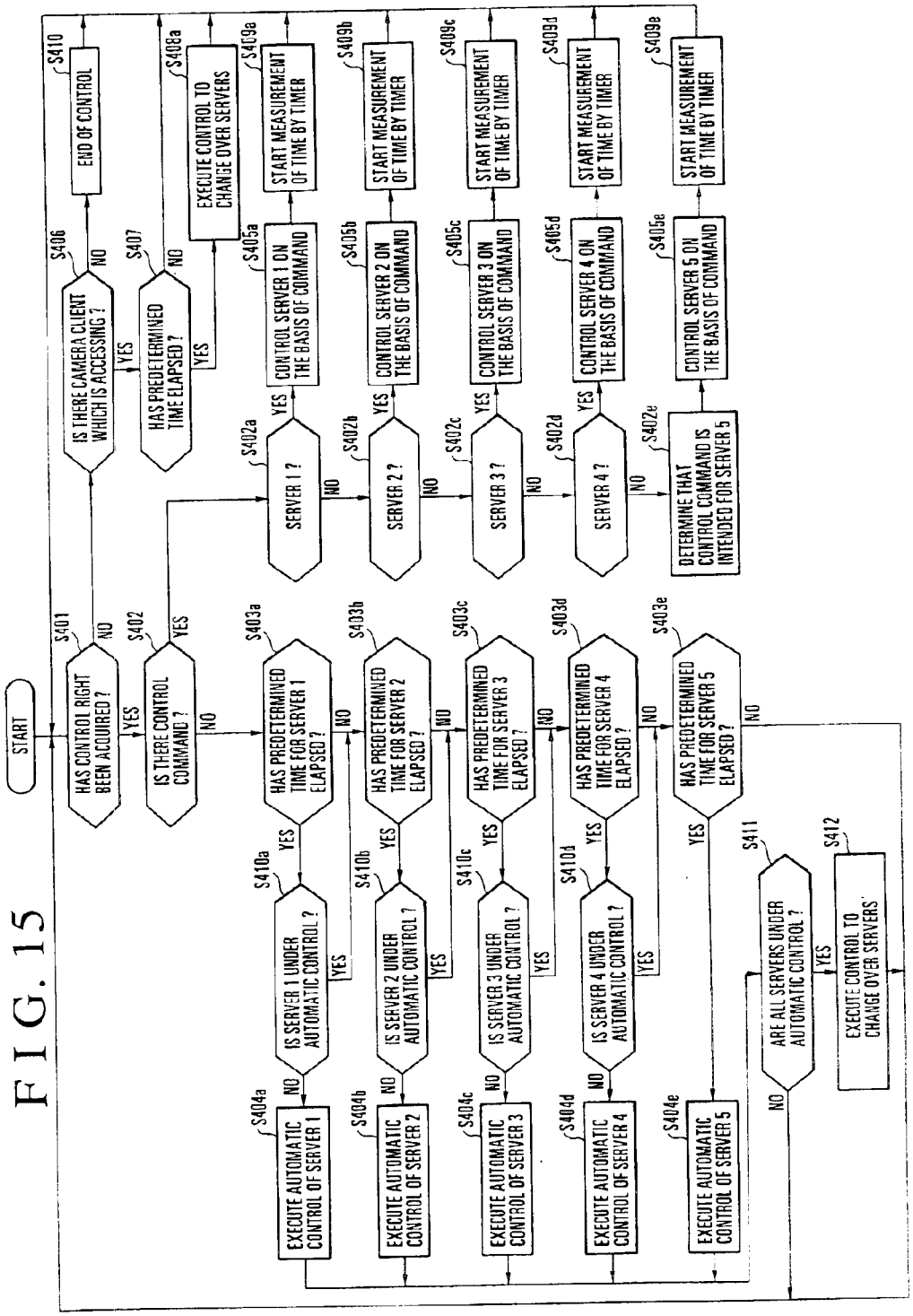

FIG. 4. is a view showing one window example in the first embodiment;

FIG. 5 is a view showing one window example in the first embodiment;

FIG. 6 is a flowchart showing an operational process of a camera server in the first embodiment;

FIG. 7 is a flowchart showing an operational process of a camera server in a fourth embodiment of the present invention FIG. 8 is a flowchart showing an operational process of a management server in a sixth embodiment of the present invention;

FIG. 9 is a flowchart showing another operational process of the management server in the sixth embodiment;

FIG. 10 is a view showing one window example in the second embodiment of the present invention;

FIG. 11 is a view showing one window example in the second embodiment;

FIG. 12 is a flowchart showing an operational process of a camera server in the second embodiment;

FIG. 13 is a flowchart showing an operational process of a camera server in a third embodiment of the present invention FIG. 14 is a diagram of a camera control system according to a fifth embodiment of the present invention;

FIG. 15 is a flowchart showing an operational process of a management server in the fifth embodiment;

FIG. 16 is a flowchart showing an operational process of a management server in a seventh embodiment of the present invention; and FIG. 17 is a schematic block diagram of a software construction in a network in each of the fifth to seventh embodiments.

DETAILED DESCRIPTION OF THE INVENTION

Preferred embodiments of the present invention will be described below with reference to the accompanying drawings.

(First Embodiment)

Figure 1:
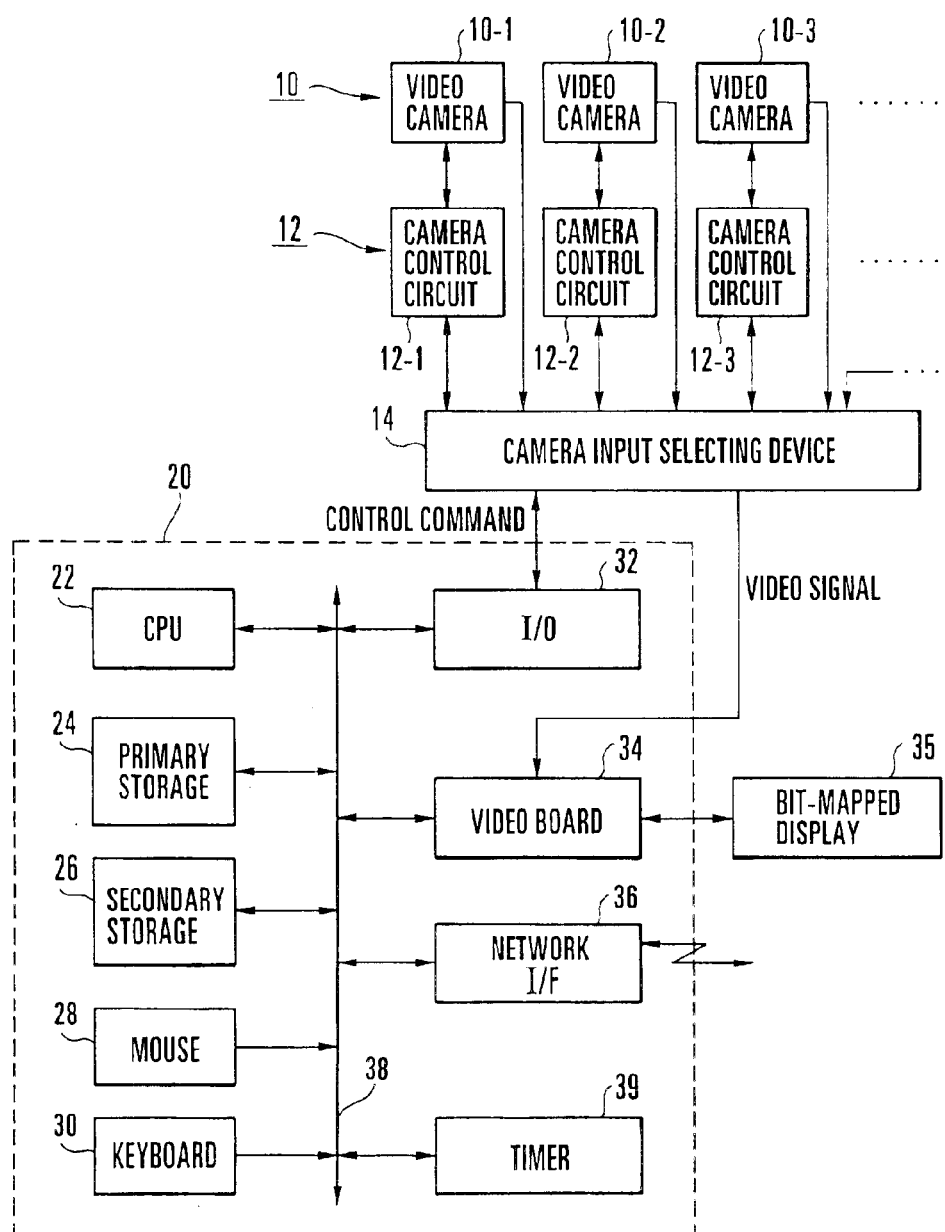
FIG. 1 is a schematic block diagram of a basic construction of a computer terminal according to a first embodiment of the present invention.

FIG. 1 is a schematic block diagram of a computer terminal to which a plurality of cameras are connected. The computer terminal shown in FIG. 1 and a plurality of computer terminals each having a construction similar to that shown in FIG. 1 are interconnected via a network to constitute the entire camera control system.

Referring to FIG. 1, reference numeral 10 generally denotes video cameras (10-1, 10-2, 10-3, . . . ) each of which can be made to adjust its operating conditions such as panning angle, tilting angle, zoom magnification, focus position and backlight correction, and reference numeral 12 generally denotes camera control circuits (12-1, 12-2, 12-3, . . . ) which control the operations of the respective video cameras (10-1, 10-2, 10-3, . . . ), such as panning, tilting, zooming, focus adjustment and iris operation, on the basis of external control signals. A camera input selecting device 14 is arranged to select from among the video cameras 10 a video camera to be controlled or a video camera which is outputting a video image to be received. The above-described arrangement may include, but not limited to, RS-232C control signal lines.

A camera manipulating device 20 is composed of a computer terminal which controls the camera input selecting device 14 to send a control command to a desired camera control circuit 12 through the camera input selecting device 14, thereby causing the camera control circuit 12 to control the corresponding video camera 10. The camera manipulating device 20 includes a CPU 22 for controlling the entire camera manipulating device 20, a primary storage 24, a secondary storage (for example, a hard disk drive) 26 which stores loci to be traced by, or positions to be reached by, each of the video cameras 10 when it is being moved in a particular image pickup direction under automatic control, a mouse 28 which serves as a pointing device, and a keyboard 30.

The camera manipulating device 20 also includes an I/O port 32 which is connected to the camera input selecting device 14 so that camera control commands and the like are supplied to the camera input selecting device 14, a video board 34 which captures a video signal output from the video camera 10 selected by the camera input selecting device 14 and displays various video images on a bit-mapped display 35, a network interface 36 which connects the camera manipulating device 20 to the network, and a system bus 38 which interconnects individual devices such as the CPU 22. If a camera control signal is sent from a remote location to the camera manipulating device 20 via the network, the desired video camera 10 can be controlled from the remote location through the network interface 36.

A timer 39 measures a time period which elapses while the CPU 22 is executing an operational process, or a time period which elapses while the video camera 10 is being controlled. In addition, the timer 39 measures a time period which elapses after the reception of a control command, for each of the video cameras 10. The timer 39 is also capable of measuring a time period which elapses after a camera control right is released.

The camera input selecting device 14 selects one control signal line from among the control signal lines connected to the respective camera control circuits 12, as well as one video output from among the video outputs from the respective video cameras 10. The camera input selecting device 14 supplies the selected video output to the video board 34, and logically connects the selected control signal line to the I/O port 32. The format of the video outputs is, for example, an NTSC television system of the type in which a luminance signal and color-difference signals are separately processed. The video board 34 captures the video output selected by the camera input selecting device 14, and displays a moving image in a predetermined window on the bit-mapped display 35 on the basis of the captured video signal.

The secondary storage 26 stores various kinds of information about the video cameras 10, such as camera position information data and camera locus data. The details of such information will be described later.

Incidentally, if only one video camera is needed, the camera input selecting device 14 is not needed and the camera control circuit 12 may be directly connected to the I/O port 32. If the camera manipulating device 20 is composed of a terminal which does not transmit a video image, the video cameras 10, the camera control circuits 12 and the camera input selecting device 14 are not needed.

Figure 2:
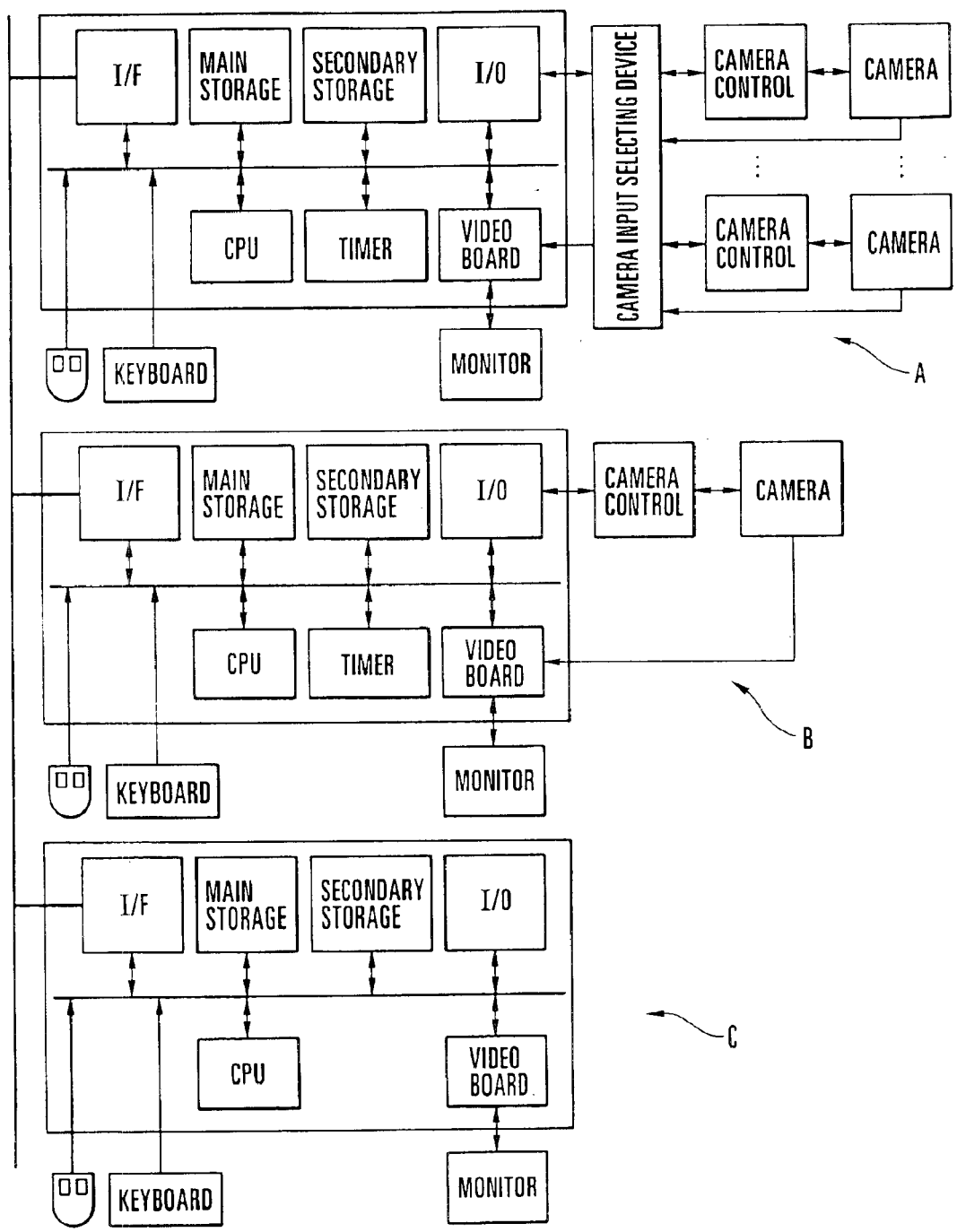
FIG. 2 is a schematic block diagram of a hardware construction in a network according to the first embodiment.

In practice, a plurality of computer terminals of the type shown in FIG. 1 are connected to the network, as shown in FIG. 2 by way of example. A terminal A has a construction identical to that of the terminal shown in FIG. 1, a terminal B to which only one video camera is connected has a construction in which one camera control circuit is directly connected to an I/O port, and a terminal C has a construction to which no video camera is connected. In general, various terminals having different constructions, such as the terminals A, B and C, are connected to one network. Incidentally, the network used in the first embodiment is a LAN or WAN which has a sufficient transmission bandwidth to transmit digital moving image data and camera control signals.

The video board 34, as described previously, has a video capturing function, and supplies captured video data not only to the bit-mapped display 35 to cause it to display a video image, but also to the CPU 22 via the system bus 38.

The CPU 22 converts video data to packets and outputs the packets to the network via the network interface 36. The CPU 22 also converts a command such as a camera manipulation command or a camera change-over command to packets and outputs the packets to the network via the network interface 36. In addition, the CPU 22 converts information about the entire camera control system to packets and outputs the packets to the network. Such data or information is transmitted to an identified destination on the network or to all other terminals.

Reception is similar to transmission. Specifically, if each of the terminals A, B and C receives video data as well as a camera manipulation command and a camera change-over command all of which are converted to packets, each of the terminals A, B and C handles the received video data similarly to captured data in its interior, and handles the received camera manipulation command and camera change-over command similarly to its internal commands. Information about the entire system (such as the operation status or communication status of the video cameras) is used for updating a system display which constitutes part of a user interface which will be described later.

Figure 3:
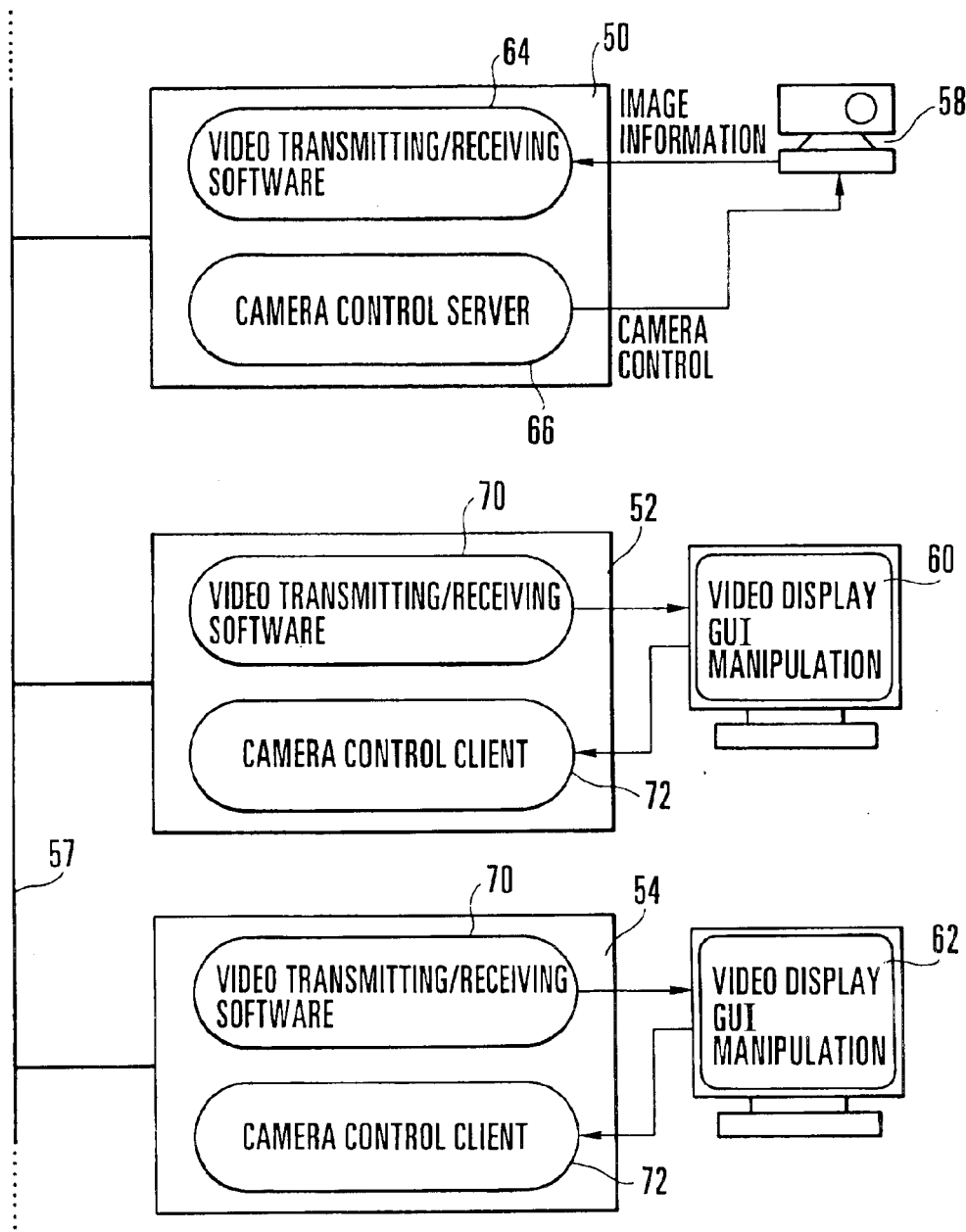
FIG. 3 is a schematic block diagram of a hardware construction in a network according to the first embodiment.

FIG. 3 shows a software arrangement according to the first embodiment of the present invention. FIG. 3 separately illustrates software for camera manipulation which is installed in a terminal (a camera server 50) to which a camera apparatus is directly connected, and software for camera manipulation which is installed in terminals (camera clients 52 and 54) for remote control of the camera apparatus. If it is necessary that a terminal to which a camera apparatus is directly connected be capable of controlling a remote camera connected to the network, both types of software are installed in the terminal.

In FIG. 3, the terminals (such as personal computers or workstations) 50, 52 and 54 are connected to a network 57.

A camera apparatus 58 which corresponds to the video camera 10 is connected to the terminal 50, and monitors (bit-mapped displays) 60 and 62 are respectively connected to the terminals 52 and 54.

Video transmitting/receiving software 64 and a camera control server (software) 66 are stored in the computer terminal (camera server) 50. The video transmitting/receiving software 64 serves to transmit image information (moving image) provided by the camera apparatus 58 to other terminals via the network 57, while the camera control server (software) 66 serves to manage the control right of the camera apparatus 58 connected to the computer terminal 50 and control the camera apparatus 58 in accordance with camera control signals supplied from the other terminals 52 and 54.

Video transmitting/receiving software 70 and a camera control client (software) 72 are stored in each of the computer terminals (camera clients) 52 and 54. The video transmitting/receiving software 70 serves to receive an image (moving image) from the terminal 50 and display the image on the corresponding one of the monitors 60 and 62, while the camera control client (software) 72 serves to display the state of a video camera (in FIG. 3, the camera apparatus 58) and a camera display control panel for remote control of the video camera which can be remotely manipulated, and to process the manipulation of the video camera.

The video transmitting/receiving software 64 and 70 have both a video transmission function and a video reception function. In general, such software is made of a single program or a group of program modules. The terminals A and C shown in FIG. 2 are respectively identical to the terminals 50 and 52 or 54 shown in FIG. 3, and the terminal B shown in FIG. 2 is identical to the terminal 52 or 54.

FIGS. 4 and 5 show user interface windows displayed on the bit-mapped display 35. FIG. 4 shows a map window 140 which represents the layout of video cameras. Camera icons 142-1 to 142-7 represent the video cameras. If any of the camera icons 142-1 to 142-7 is clicked with a cursor 2-29, the window 2-3 shown in FIG. 5 is displayed and a video image supplied from the video camera which corresponds to the clicked camera icon is displayed in a video window 2-1.

Referring to FIG. 5, buttons 2-28a, 2-28b, 2-28c and 2-29d are used for issuing control instructions to change the image pickup direction of the camera apparatus 58 to the upward, downward, rightward and leftward directions, respectively. The issuance of these control instructions to change the image pickup direction is also possible by moving the cursor 2-29 to the desired one of indicators 2-212 and 2-221 displayed in scroll bars 2-21 and 2-22 and dragging the desired indicator 2-212 or 2-221. The scroll bars 2-21 and 2-22 respectively allow issuance of control instructions to change the image pickup direction with respect to panning and tilting directions.

A scroll bar 2-23 is used for changing zoom magnification, and the indicator in the scroll bar 2-23 is dragged with the mouse 28 to issue a camera control instruction.

An automatic control button 2-30 is a button for selecting a video camera from among a plurality of video cameras displayed in the video window 2-1 and executing automatic control of the video camera selected.

These issued instructions are outputted to the camera server 50 via the network 57, and further to the camera apparatus 58.

Incidentally, each of the panning and tilting angles of the camera apparatus 58 is given as the angle between a particular initial position and the central axis of a lens of the camera apparatus 58. The particular initial positions for the respective panning and tilting angles are set to the middle positions in the ranges of physical panning and physical tilting.

A user who desires to control the camera apparatus 58 clicks a CONTROL ON button 2-24 to issue a request to acquire the control right of the video camera connected to the camera server 50 and output the request to the camera control server 66.

If the control right of the video camera connected to the camera server 50 is acquired, the display modes of the individual buttons in the camera control window 2—2 vary and various manipulations of the video camera become possible. Incidentally, in a display message area 2-26, the display "CONTROL NOT ACCEPTED" is turned on if the camera apparatus 58 is uncontrollable due to the fact that, for example, another client is controlling the video camera or the video camera is out of order.

If the control right is not acquired, the manipulation of the buttons other than the CONTROL ON button 2-24 is not allowed. If a CAMERA CONTROL OFF button 2-25 is clicked, an instruction to release the control right of the video camera is issued. When this instruction is outputted to the camera control server 66, the camera control manipulation of the camera client itself is cancelled by the camera control server 66.

If a CONNECTION OFF button 2-27 is clicked, the current communication with the camera apparatus 58 whose video image is displayed in the video window 2-1 is brought to an end, and the map window 140 shown in FIG. 4 is again displayed.

FIG. 6 is a flowchart showing the operational process of a camera server according to the first embodiment. It is assumed here that the camera server is composed of a computer terminal and that a control program for executing control of the camera server is stored in the secondary storage 26 and when the CPU 22 is to execute the control program, the control program is loaded into the primary storage 24. It is also assumed that in the first embodiment, one camera apparatus 58 is connected to one camera server 50.

Referring to FIG. 6, first, in Step S101, it is determined whether the control right of the camera apparatus 58 is acquired by a camera client. If it is determined in Step S101 that the control right is not acquired by any camera client, the process proceeds to Step S106, in which it is determined whether there is a camera client which is accessing the camera server 50 (a camera client to which video data is being outputted from the camera server 50). If there is no camera client which is accessing the camera server 50, the control of the video camera remains stopped.

Contrarily, if it is determined in Step S106 that there is a camera client which is accessing the camera server 50, the process proceeds to Step S107, in which the timer 39 is made to measure a time period which elapses after the control right of the camera apparatus 58 is released from the camera client. If a predetermined time period is measured, the process proceeds to Step S104, in which a locus to be traced by the video camera 10 (the camera apparatus 58) under automatic control and a zoom value corresponding to an image pickup direction to be taken by the video camera 10 under the automatic control are read from the secondary storage 26 into the primary storage 24, and automatic control of the operation of the video camera 10 is executed on the basis of the read information. Incidentally, immediately after in Step S107 the predetermined time period is cleared to "0", i.e., the control right of the video camera 10 is released, the automatic control of the operation of the video camera 10 may be executed in Step S104.

If it is determined in Step S101 that the control right is acquired, the process proceeds to Step S102, in which it is determined whether a control command is received by the camera server 50. If a control command is received, the process proceeds to Step S105, in which control of the image pickup direction, the zooming operation or the like of the video camera 10 is executed on the basis of the control command. If it is determined in Step S103 that the timer 39 has measured a predetermined time period after the reception of the control command to execute control of the image pickup direction or the zooming operation or the like, the process proceeds to Step S104, in which the automatic control of the operation of the video camera 10 is executed.

As described above, in the first embodiment, if a camera client is not executing control of a video camera in spite of having the control right of the video camera, a camera server enters a mode of automatic control of the video camera when a predetermined time period elapses after the camera server receives a final camera control request. Accordingly, at a camera client which does not have a control right and is receiving a video image from the video camera, an operator can check the surroundings of a place where the video camera is disposed, and can also view a video image of a scene of interest at any time.

In addition, since the camera server enters the mode of automatic control of the video camera even when the control right of the video camera is released, the camera server can smoothly provide a video image of a scene of interest to a camera client which is receiving a video image from the video camera.

If there is neither a camera client which has acquired the control right of the video camera nor a camera client which is not accessing the camera server, the camera server does not execute the automatic control of the video camera, whereby power consumption can be reduced.

In the first embodiment, the loci to be traced by the video camera 10 during the execution of the automatic control are stored in the secondary storage 26. However, in the construction and the operational process of the first embodiment, instead of such loci, information, such as a predetermined image pickup direction and a zoom magnification to be used when the video camera is controlled to turn in the image pickup direction, may be stored in the secondary storage 26 so that the CPU 22 reads the stored information and executes automatic control of the image pickup direction of the video camera, a zoom magnification corresponding to the image pickup direction and the like, on the basis of the read information. In this case, a most desired image pickup direction as viewed from a place where the video camera is disposed may also be stored in the secondary storage 26. The above description similarly applies to each of second to seventh embodiments which will be described later.

The predetermined image pickup direction to be stored may also be a central position within the controllable image pickup range of the video camera.

Although the first embodiment is arranged to execute automatic control of the image pickup direction and the zooming of the video camera, automatic control of other operations such as adjustment of focus position (subject distance) and the operation of turning on or off a backlight correction function may also be executed.

Although in the above-described camera control system one video camera is connected to the camera server 50, the object of the first embodiment can also be achieved by an arrangement of the type in which, as shown in FIG. 1, a plurality of video cameras are connected to the camera server 50 via the camera input selecting device 14 so that the control right of each of the video cameras is given to the camera client 54. In this case, the video cameras connected to the camera server 50 are respectively assigned different identification numbers, and since information indicative of the identification number of a video camera to be controlled is added to information issued from the camera client 54, such as a command to acquire the control right of the video camera or a camera control command for the video camera, the camera control server 66 can detect which of the video cameras corresponds to information which is currently being transmitted or received by the camera control server 66, and can execute the operational process of the first embodiment.

(Second Embodiment)

In the second embodiment, a plurality of video cameras are connected to one camera server, and the control rights of the respective video cameras connected to the camera server are given to one camera client. The construction of the camera control system used in the second embodiment is identical to that shown in FIGS. 1 to 3, and the description thereof is omitted.

In the second embodiment, software modules, such as a module for outputting in a time-division manner the video data of the plurality of video cameras (for example, video cameras D, E and F) which are changed over by the camera input selecting device 14 or exclusive transmission modules for the respective video cameras D, E and F, are incorporated in the video transmitting/receiving software 64 of the camera manipulating device 20 so that the video data of the plurality of the video cameras D, E and F connected to the camera server 50 via the camera input selecting device 14 can be outputted at the same time.

FIGS. 10 and 11 show several examples of windows shown on the bit-mapped display 35 on the camera-client side.

Referring to FIG. 10, a map window 300 is similar to the map window 140 used in the first embodiment, and camera icons (denoted by CAMERA 1 to CAMERA 5) indicative of the positions of individual video cameras are displayed on the map window 300. Incidentally, in the second embodiment, a plurality of video cameras corresponding to a plurality of camera icons displayed on one map window are connected to one camera server.

If a title displayed in a map list window 301 is clicked once by the cursor 2-29, a map corresponding to the clicked title is displayed on the map window 300 (in the case of FIG. 10, a map titled OFFICE 3 is displayed on the map window 300).

If the same title is continuously clicked twice, the entire display window changes into the state shown in FIG. 11, whereby the video images supplied from the plurality of video cameras connected to the camera server 50 are respectively displayed on video display windows 302a to 302 (in FIG. 11, the video images supplied from the respective video cameras represented by the camera icons CAMERA 1 to CAMERA 5 and connected to the camera server disposed in a place corresponding to the map titled OFFICE 3).

The description of the camera control window 2—2 shown in FIG. 11 is omitted because the camera control window 2—2 shown in FIG. 11 is identical to that described previously in connection with FIG. 5 except that a plurality of video cameras are connected to the camera server and the control rights of the plurality of video cameras can be acquired. For example, if an operator situated at a camera client desires to acquire the control rights of the plurality of video cameras connected to the camera server, the operator clicks the CONTROL ON button 2-24.

Referring to FIG. 11, if the operator acquires the control rights of the plurality of video cameras connected to the camera server and desires to select a video camera to be controlled, from the video display windows 302a to 302e, the operator moves the cursor 2-29 to and selects (clicks once on) a video display window on which the desired video image is displayed (in the case of FIG. 11, the video display window 302c).

Then, the frame of the video display window corresponding to the video camera to be controlled is displayed as a thick frame (in FIG. 11, the video display window 302c for the video camera corresponding to the camera icon CAMERA 3). Then, the camera client outputs to the camera control server 66 information (identification number) about the video camera to be controlled, which video camera has been selected from among the plurality of video cameras connected to the camera server. The camera control server 66 recognizes the information and executes control of the video camera.

FIG. 12 is a flowchart showing the operational process of the camera server 50 according to the second embodiment. It is assumed here that a control program for executing the control of the camera server 50 is stored in the secondary storage 26 and when the CPU 22 is to execute the control program, the control program is loaded into the primary storage 24. Although in the description of FIG. 12 five video cameras (CAMERA 1 to CAMERA 5) are connected to the camera server disposed in the place corresponding to the map titled OFFICE 3, the second embodiment can, in general, be applied to camera servers of the type to which a plurality of video cameras are connected.

Referring to FIG. 12, first, in Step S301, it is determined whether the control rights of the plurality of video cameras connected to the camera server 50 are acquired by a camera client. If it is determined in Step 5301 that the control rights are not acquired by any camera client, the process proceeds to Step S306, in which it is determined whether there is a camera client which is accessing the camera server 50 (a camera client to which video data is being outputted from the camera server 50). If there is no camera client which is accessing the camera server 50, the process proceeds to Step S310, in which the control of the video camera remains stopped.

Contrarily, if it is determined in Step S306 that there is a camera client which is accessing the camera server 50, the process proceeds to Step S307. If it is determined in Step S307 that a predetermined time period has elapsed since the control rights of the plurality of video cameras connected to the camera server 50 were released from the camera client, the process proceeds to Step S308, in which loci to be traced by the respective video camera connected to the camera server 50 under automatic control and information about zoom values corresponding to image pickup directions to be taken by the plurality of video cameras under the automatic control are read from the secondary storage 26 into the primary storage 24, and automatic control of all the video cameras (CAMERA 1 to CAMERA 5) is executed on the basis of the read information.

If it is determined in Step S301 that the control rights are acquired by a certain camera client, the process proceeds to Step S302, in which it is determined whether a control command is received by the camera server 50. If a control command is received, the process proceeds to Steps S302a to S302e for the purpose of determining which of the video cameras corresponds to the control command, on the basis of a video-camera identification number added to the control command.

After it has been determined in one of Steps S302a to S302e which of the video cameras corresponds to the control command, the process proceeds to the corresponding one of Steps S305a to S305e, in which control of the image pickup direction, the zooming operation or the like of the determined video camera is executed on the basis of the control command. Then, the process proceeds to the corresponding one of Steps S309a to S309e, in which the timer 39 is made to measure a time period for the video camera the control of which has been executed (for example, the video camera corresponding to the camera icon CAMERA 3), after the completion of reception of the control command.

If it is determined in Step S302 that a control command for the video cameras is not received by the camera server 50, it is determined (Steps S303a to S303e) whether the time period measured in each of Steps S309a to S309e (the time period for which the control command for the video cameras is not received) has reached a predetermined time, with respect to each of the video cameras corresponding to the camera icons CAMERA 1 to CAMERA 5.

If it is determined in any one of Steps S303a to S303e that the time period for which a control command for one of the video cameras is not received has reached the predetermined time, the process proceeds to the corresponding one of Steps S304a to S304e, in which automatic control of the corresponding video camera is executed on the basis of the automatic-control information stored in the secondary storage 26 (information indicative of a locus and a zoom magnification to be used when the corresponding video camera is being moved in an image pickup direction during execution of automatic control). For example, if it is determined in Step S303b that a control command for the video camera corresponding to the camera icon CAMERA 2 has not been received for the predetermined time, the process proceeds to Step S304b, in which automatic control of the video camera is executed. Incidentally, if it is determined in one of Steps S310a to S310d that the automatic control of the corresponding video camera is being executed, it is determined in the corresponding one of Steps S303a to S303d whether the next predetermined time period for the video camera has elapsed.

As described above, in an arrangement in which a plurality of video cameras are connected to one camera server and the control rights of the respective video cameras connected to the camera server are given to one camera client, the camera server, when a camera client having the control rights is controlling one video camera, enters an automatic-control mode when a predetermined time period elapses after a control command for another video camera not controlled is received. Accordingly, if there is a camera client which is accessing the camera server (receiving a video image from the camera server), an operator situated at the accessing camera client can check the surroundings of a place where the video camera not controlled is disposed, and can also view a video image of a scene of interest at any time.

(Third Embodiment)

The third embodiment makes it possible to display a video image received from a video camera on a large display window as shown in FIG. 5, in an arrangement in which a plurality of video cameras are connected to one camera server.

In the third embodiment, if the control rights of video cameras are not acquired by any camera client or if the control rights of video cameras are acquired by a camera client but a control command to control the image pickup direction or the zooming of any one of the video cameras connected to a camera server is not received for a predetermined time, automatic control of the video cameras is executed while the video cameras are being changed over from one video camera to another.

FIG. 10 shows a monitor window displayed on the side of a camera client, which is similar to that used in the second embodiment. In the third embodiment, if any one of the camera icons (in FIG. 10, CAMERA 1 to CAMERA 5) displayed on the map window 300 is continuously clicked twice, the camera client outputs to the video transmitting/receiving software 64 a request to acquire video information (in FIG. 10, a request to acquire video information from a video camera corresponding to the camera icon CAMERA 3 disposed in a place corresponding to the map titled OFFICE 3).

The video transmitting/receiving software 64 outputs a video image of the video camera which corresponds to the request. The video image of one particular video camera, which has been obtained from the camera server in this manner, is displayed on the video window 2-1.

FIG. 13 is a flowchart showing the operational process of the camera server 50 according to the third embodiment. A control program for executing the control of the camera server 50 is stored in the secondary storage 26, and since steps which are shown in FIG. 13 and denoted by step numbers identical to those shown in FIG. 12 execute operational processes identical to those described previously with reference to FIG. 12, the description thereof is omitted.

Referring to FIG. 13, in Step S308a, if no camera client acquires the control rights from the camera server 50 but there is a camera client which is accessing the camera server 50 (a camera client which is receiving a video image from the camera server 50), the CPU 22 calls information stored in the secondary storage 26, such as loci to be traced by the respective video cameras while they are moving in their image pickup directions, zoom values corresponding to the respective image pickup directions and the order of changeover of the video signals outputted from the respective video cameras, and the CPU 22 changes over, on the basis of the time measurement of the timer 39, the video signal outputs from a plurality of video cameras which are being supplied to the camera client which is accessing the camera server 50.

Referring to Step S311, if it is determined in Step S311 that the control rights are acquired by a camera client but control commands for all the video cameras connected to the camera server 50 are not received for a predetermined time period and all the video cameras are placed under automatic control, the CPU 22, similarly to Step S308a, calls information stored in the secondary storage 26, such as loci to be traced by the respective video cameras while they are moving in their image pickup directions, zoom values corresponding to the respective image pickup directions and the order of changeover of the video signals outputted from the respective video cameras, and the CPU 22 changes over, on the basis of the time measurement of the timer 39, the video signal outputs from the plurality of video cameras which are being supplied to the camera client which is accessing the camera server 50 (S312).

As described above, if the control rights of a plurality of video cameras connected to a camera server are not acquired by any camera server or if the control rights of the plurality of video cameras connected to the camera server are acquired by a camera client but control commands for all the video cameras connected to the camera server are not received for a predetermined time, the video signals outputted from the respective video cameras can be transmitted to a camera client which is accessing the camera server, while the video signals are being changed over from one signal to another at intervals of a predetermined time. Accordingly, the camera client which is accessing the camera server can easily check the video images of all the video cameras connected to the camera server, and can obtain a video image of a scene of interest at any time.

Although in the third embodiment the video cameras connected to the camera server are automatically controlled while they are being changed over from one video camera to another, a representative video camera to be automatically controlled may be designated in advance and only the designated video camera may be automatically controlled so that only the obtained video data is outputted. This operational process can be executed by substituting the process of executing automatic control of only a designated video camera for the above-described camera changeover control in Step S312 of the flowchart of FIG. 13.

(Fourth Embodiment)

In the fourth embodiment of the present invention, unlike any of the first to third embodiments, automatic control is executed on a particular image pickup direction and a particular zoom value which have been controlled with highest frequencies, respectively. In the following description, for the sake of simplicity, it is assumed that one camera server is connected to one camera server.

In the fourth embodiment, the range of the image pickup direction of the controllable video camera 10 and the zoom value thereof are divided into a plurality of ranges, and the time period required to control the image pickup direction and the zoom value of the video camera on the basis of a control command of a client is measured for each of the ranges, and an image pickup direction and a zoom value which correspond to a range for which the largest measured value has been obtained are selected so that the video camera is automatically controlled on the basis of the selected image pickup direction and zoom value.

FIG. 7 is a flowchart showing the operational process of a camera server according to the fourth embodiment. It is assumed here that a control program for executing control of the camera server is stored in the secondary storage 26 and when the CPU 22 is to execute the control program, the control program is loaded into the primary storage 24.

If it is determined in Step S102 that the camera server receives a control command from a camera client having the control right of the camera server, the process proceeds to Step S105, in which control of the video camera 10 is executed on the basis of the control command. In Step S105a, a check is made as to which of the divided ranges of the image pickup direction and the zoom value corresponds to the range in which the video camera is currently being controlled, and the control time period of the video camera in the image pickup range and zoom range in which the video camera is currently being controlled is measured and stored in the primary storage 24.

In Step S104, during automatic control, the range in which the total of the control time period of the video camera is largest is selected from among the plurality of ranges, and the video camera 10 is controlled within such range.

Since the fourth embodiment is similar to the first embodiment except for the above-described operational process, the description of the other operational processes is omitted.

In this manner, in the fourth embodiment, since the image pickup direction of the video camera can be controlled so that the video camera turns to a most frequently selected position in the image pickup direction, the video camera can be automatically controlled to turn in the image pickup direction preferred most by camera clients.

Incidentally, in the first to fourth embodiments, in a case where no camera client other than a camera client which has acquired the control right of the video camera is accessing the video camera (acquiring a picked-up image from the video camera), automatic control of the video camera is not executed if a control command for the video camera is not being received for a predetermined time period from the camera client which has acquired the control right. In this case, the camera control server 66 determines whether to execute automatic control, by determining whether there is a camera client which has acquired the control right of the video camera as well as whether a participant other than the camera client which has acquired the control right is accessing the video camera.

(Fifth Embodiment)

The fifth embodiment provides, for example, an arrangement in which camera servers connected to a network are grouped into groups A, B, C, . . . , as shown in the diagram of FIG. 14, and a management server 56 gives a control right to each of the groups at the request of a camera client.

Incidentally, the camera system used in each of the fifth to seventh embodiments is provided with the management server 56, as shown in FIG. 17.

A camera management server (software) 68 is installed in the computer terminal (management server) 56, and the camera control server 66 informs the camera management server 68 that the camera apparatus 58 is available via the network 57, at the time of activation of the camera apparatus 58, and the camera management server 68 registers the camera apparatus 58 whose activation the camera management server 68 has been informed of, at a list of available video cameras.

The camera management server 68 is software for managing all the video cameras connected to the network 57, and the processing of the camera management server 68 is executed by a CPU (not shown). The camera management server 68 manages not only registration accompanying the connection of a video camera to the network 57 and erasure accompanying the separation of a video camera from the network 57, but also acceptance or refusal of a camera access request from a user. Furthermore, the camera management server 68 periodically informs all the camera clients of operation information such as the image pickup direction and the angle of view of a video camera via the network 57.

The management server 56 informs all the camera clients which of the camera clients has acquired the control right of a camera server connected to the network 57. Furthermore, the management server 56 informs all the camera clients whether there is a camera client which is accessing the camera server (whether there is a camera client to which video data is being outputted from the camera server).

The camera management server 68 has the timer 39 which measures a changeover time period required to change over a plurality of video cameras from one video camera to another under automatic control. Further, the camera management server 68 stores the image pickup directions of the respective video cameras each of which is to be controlled when it is selected during a changeover from one video camera to another, and the number of times by which the control right of each of the video cameras is acquired by a camera client.

In addition, the camera management server 68 executes measurement of time which elapses after the camera management server 68 transmits a camera parameter.

Since the constructions of the other portions shown in FIG. 17 are similar to those shown in FIG. 3, the description thereof is omitted.

The management server 56 may have a construction identical to any of the constructions of the respective terminals A to C shown in FIG. 2.

FIG. 15 is a flowchart showing the operational process of the camera server 50 according to the fifth embodiment. The operational process of the management server 56 is executed on the basis of a stored program read from a storage medium.

Referring to FIG. 15, first, in Step S401, it is determined whether the control right of a particular group (in the fifth embodiment, the group A) of camera servers is acquired by a camera client. If it is determined in Step S401 that the control right is not acquired by any camera client, the process proceeds to Step S406, in which it is determined whether there is a camera client which is accessing the group (a camera client to which video data is being outputted from a video camera of the group A). If there is no camera client which is accessing the group, the process proceeds to Step S410, in which the video cameras of the group A remain stopped.

Contrarily, if it is determined in Step S406 that there is a camera client which is accessing the group, the process proceeds to Step S407, in which it is determined whether a predetermined time period has elapsed since the control right of the group A was released from the camera client. If it is determined in Step S407 that the predetermined time period has elapsed, the process proceeds to Step S408a. In Step S408a, if the control right of the group A is not acquired by any camera client but there is a camera client which is accessing the group A (receiving a video image from a camera server of the group A), the camera management server 68 calls from the respective camera servers of the group A information stored in their respective secondary storages 26, such as loci to be traced by the respective video cameras while they are moving in their image pickup directions, zoom values corresponding to the respective image pickup directions and the order of changeover of the video signals outputted from the respective video cameras. Then, on the basis of the time measurement of the timer 39, the camera management server 68 change over the video signal outputs from a plurality of video cameras which are being supplied to the camera client which is accessing the group A.

The video signals outputted in this manner are displayed on the video window 2-1 shown in FIG. 5 on the side of the camera client. In addition, on the side of the camera client, the images of the camera server 1 to the camera server 5 can be displayed at the same time on the respective windows such as those shown in FIG. 11. In this case, it is not necessary to change over the video outputs of the camera servers 1 to 5. According to the fifth embodiment, in FIG. 11, "CAMERA 1" to "CAMERA 5" are replaced with "CAMERA SERVER 1" to "CAMERA SERVER 5", and "OFFICE 3" is replaced with "GROUP A".

If it is determined in Step S401 that the control right of the group A is acquired by the camera client, the process proceeds to Step S402, in which it is determined whether a control command is received. If a control command is received, the process proceeds to Steps S402a to S402e for the purpose of determining which of the camera servers corresponds to the control command, on the basis of information indicative of a camera-server identification number added to the control command.

After it has been determined in one of Steps S402a to S402e which camera server and which video camera correspond to the control command, the process proceeds to the corresponding one of Steps S405a to S405e, in which a control command such as a command to control an image pickup direction or zooming is outputted to the camera server selected. Then, the process proceeds to the corresponding one of Steps S409a to S409e, in which the timer 39 is made to measure a time period for the camera server (for example, the camera server 3), in response to the reception of the control command for the video camera.

If it is determined in Step S402 that a control command for the video camera connected to the camera server is not received, it is determined (Steps S403a to S403e) whether the time period measured in each of Steps S409a to S409e (the time period for which the control command for the video camera is not received) has reached a predetermined time, with respect to each of the camera servers 1 to the camera servers 5.

If it is determined in any one of Steps S403a to S403e that the time period for which the control command for one of the camera servers is not received has reached the predetermined time, the process proceeds to the corresponding one of Steps S404a to S404e, in which automatic control of the corresponding camera server is executed on the basis of the automatic-control information stored in the secondary storage 26 (information indicative of a locus or a zoom magnification to be used when the corresponding video camera is being moved in the image pickup direction during execution of automatic control), thereby outputting a video image of the automatically controlled video camera to the camera client which is accessing the camera server.

For example, if it is determined in Step S403b that a control command for the camera server 2 has not been received for the predetermined time, the process proceeds to Step S404b, in which automatic control of the camera server 2 is executed. Incidentally, if it is determined in one of Steps S410a to S410d that the automatic control of the corresponding camera server is being executed, it is determined in the corresponding one of Steps S403a to S403d whether the next predetermined time period for the camera server has elapsed.

Referring to Step S411, if it is determined in Step S411 that the control rights of the camera servers of the group A are acquired by a camera client but control commands for all the camera servers of the group A are not received for a predetermined time period and all the camera servers of the group A are executing automatic control, the camera management server 68, similarly to Step S408a, calls from the secondary storages 26 of the respective camera servers the stored information, such as loci to be traced by the respective video cameras while they are moving in their image pickup directions, zoom values corresponding to the respective image pickup directions and the order of changeover of the video signals outputted from the respective video cameras, and on the basis of the time measurement of the timer 39, the camera management server 68 changes over the video signal outputs from the plurality of video cameras which are being supplied to the camera client which is accessing the group A (S412).

As described above, in accordance with the fifth embodiment, even a camera client which has no control right can check the video images of the respective video cameras connected to all the camera servers in the group A, and can obtain a video image of a scene of interest at any time.

(Sixth Embodiment)

The sixth embodiment of the present invention is intended to execute automatic control while changing over a plurality of video cameras connected to a network from one video camera to another.

FIG. 8 is a flowchart showing an operational process to be executed by the management server 56 when the management server 56 receives a request to acquire a camera control right, from a camera client.

First, the management server 56 determines in Step S501 whether it has received a request to acquire a camera control right, from a camera client on a network. If the management server 56 determines in Step S501 that such request has been received, the process proceeds to Step S502, in which the management server 56 determines whether the control right of a video camera to be controlled in response to the control request is acquired by another camera client or whether it is undesirable in terms of security to allow the camera client which has issued the control right to control the video camera.

If the management server 56 determines that the camera client can be allowed to acquire the control right, the process proceeds to Step S503, in which the control right is issued to the camera client which has issued the control request, and the camera client is allowed to be connected to and control the video camera.

In Step S504, the number of times by which the control right of the video camera has been given to the camera client is counted. Incidentally, such number of times is counted for each of the video cameras each time its control right is issued.

FIG. 9 is a flowchart showing an operational process to be executed by the management server 56 when automatic control of a plurality of video cameras is to be executed from a camera client.

In Step S601, if the automatic control button 2-30 is turned on at a camera client and the management server 56 receives an automatic operation control command, the process proceeds to Step S602, in which it is determined whether the control right of a video camera whose operation is to be automatically controlled is acquired by another camera client. If it is determined that the control right of the video camera whose operation is to be automatically controlled is acquired by the other camera client, the process proceeds to Step S605, in which it is determined that automatic control is not accepted, and the camera client which has issued the automatic operation control request is informed to that effect.

If it is determined in Step S602 that the control right of the video camera whose operation is to be automatically controlled is not acquired by the other camera client, the process proceeds to Step S603, in which the number of times by which the control right of each of the video cameras has been issued is read out from a memory 40.

In Step S604, the camera management server 68 executes changeover of the control times of the respective video camera in proportion to the number of times by which the control rights of the respective video cameras have been issued. Then, a command to control the image pickup direction of each of the video cameras is outputted for each of the video cameras in response to the changeover.

As described above, the image pickup times of the respective video cameras are weighted during automatic control of the plurality of video cameras according to the number of times by which the control right of each of the video cameras has been issued, whereby it is possible to realize user-friendly control; for example, it is possible to increase the image pickup time period of a video camera whose video image is most popular among camera clients. Although in the sixth embodiment the image pickup time periods of the respective video cameras are weighted during automatic control of the plurality of video cameras according to the number of times by which the control right of each of the video cameras has been issued, such image pickup time periods may be weighted according to the number of times by which a control right acquiring request has been received or the total number of camera clients to which video images have been transmitted.

In addition, each time the video cameras are changed over from one video camera to another, a command is issued so that a video camera selected by the changeover is controlled to turn in its previously stored image pickup direction, whereby the management server 56 can supply an image of primary interest at any times.

(Seventh Embodiment)

The seventh embodiment of the present invention is intended to group camera servers into a plurality of groups as shown in FIG. 14 and execute automatic control in each of the groups while performing weighting of changeover time periods, as described above in connection with the sixth embodiment. Incidentally, in the seventh embodiment, it is assumed that the control rights of the camera servers can be acquired for each of the camera servers.

In the management server 56, if a request to acquire the control right of a camera server is received from a camera client, the number of times by which the control right has been issued is counted for each of the camera client, as shown in FIG. 8.

FIG. 16 is a flowchart showing the operational process of the management server 56 according to the seventh embodiment. The operational process shown in FIG. 16 is executed on the basis of a predetermined program read from a storage medium (not shown) in the management server 56.

First, in Step S701, it is determined whether the control right of a camera server in a group (for example, the group A shown in FIG. 14) is acquired. If it is determined that the control right of even one camera server in the group A is acquired, the process proceeds to Step S703. On the other hand, if none of the control rights of the camera servers in the group A is acquired, the process proceeds to Step S702.

If it is determined in Step S702 that there is a camera client which is accessing the group A, the process proceeds to Step S704, in which the output time periods of the video signals of the respective camera servers are changed over according to the number of times by which the respective control rights have been issued, as described above in connection with the sixth embodiment, and the video signals are outputted to the camera client which is accessing the group A.

In Step S703, it is determined whether none of the camera servers in the group A has received a control command for a predetermined time period. If it is determined that none of the camera servers has received a control command for the predetermined time period, the process proceeds to Step S702. If it is determined in Step S702 that there is a camera client which is accessing the group A, the above-described automatic control is executed in Step S704.

Each time the video cameras are changed over from one video camera to another, a command is issued so that a video camera selected by the changeover is controlled to turn in its previously stored image pickup direction, whereby the management server 56 can supply an image of primary interest at any times.

Furthermore, even if the control right is acquired, if no control command has been received by the management server 56 for a predetermined time period, it is possible to control the changeover of the output time periods of the video signals of the respective camera servers according to the number of times by which the respective control rights have been issued, whereby it is possible to provide a user-friendly system.

Incidentally, it is also possible to achieve each of the above-described embodiments of the present invention by supplying a system or an apparatus with a storage medium on which the program code of software for realizing the function of each of the embodiments is recorded, and causing a computer (a CPU or an MPU) of the system or the apparatus to read out and execute the program code stored in the storage medium.

In this case, the program code itself read out from the storage medium realizes the function of each of the above-described embodiments, and the storage medium which stores the program code constitutes part of each of the embodiments of the present invention.

The storage medium for supplying such program code may make use of, for example, floppy disk, hard disk, optical disk, magneto-optical disk, CD-ROM, CD-R, magnetic tape, nonvolatile memory card, ROM or the like.

Although the function of each of the above-described embodiments can be realized by a computer which reads and executes a program code, the function of each of the above-described embodiments may also be realized by an OS (operating system) or the like running on the computer, in such a way that the OS or the like performs the whole or part of actual processing on the basis of an instruction of the program code.

In addition, the function of each of the above-described embodiments may be realized in such a way that a program code read out from the storage medium is written into either a memory provided in an expansion board inserted in the computer or a memory provided in an expansion unit connected to the computer and a CPU or the like provided on the expansion board or the expansion unit performs the whole or part of actual processing on the basis of an instruction of the program code.

If each of the above-described embodiments of the present invention is applied to the storage medium, program codes corresponding to the flowchart described previously are stored in the storage medium. In brief, modules essential to the camera control system according to each of the above-described embodiments of the present invention are stored in the storage medium.

Although the description of each of the above-described embodiments has referred to the camera control system, it is also possible to achieve the object of each of the above-described embodiments of the present invention by providing only camera servers.

As is apparent from the foregoing description, in accordance with each of the above-described embodiments of the present invention, it is possible to provide a video image of interest even to a client (computer terminal) having no camera control right. In addition, it is possible to provide a user-friendly camera control system; for example, during automatic control, it is possible to increase the control time period of a video camera whose video image is most popular among camera clients, by weighting the changeover of the changeover of the control time periods of a plurality of video cameras.

What is claimed is:

1. A camera control system for controlling a video camera from a computer terminal via a network, comprising:
    a video transmitting device adapted to transmit image signals obtained by the video camera; and
    a control device adapted to control the video camera on the basis of a control command from the computer terminal;
    wherein said control device is adapted to start to execute automatic control of the video camera with transmitting image signals obtained by the automatic control to the computer terminal if the control command for the video camera is not received from the computer terminal for a predetermined period.

2. A camera control system according to claim 1,
    wherein said control device stops automatic control of the video camera if the video image of the video camera is not outputted by said video transmitting device.

3. A camera control system according to claim 1, further comprising:
    an issuing device adapted to issue a control right of the video camera to one of a plurality of computer terminals which makes a request to acquire the control right of the video camera which is required for said control device to control the video camera,
    wherein said control device executes automatic control of the video camera if the control right of the video camera is not issued to any of the plurality of computer terminals by said issuing device.

4. A camera control system according to claim 3, wherein said control device executes automatic control of the video camera if a predetermined time period elapses after the control right of the video camera is released.

5. A camera control system according to claim 3, further comprising:
    video transmitting device adapted to transmit a video image of the video camera in response to a request from each of the plurality of computer terminals,
    wherein said control device stops automatic control of the video camera if the video image of the video camera is not outputted from said video transmitting device to any computer terminal other than the computer terminal to which the control right of the video camera is issued.

6. A camera control system according to claim 3, wherein said issuing device issues control rights of a predetermined plurality of video cameras to one computer terminal.

7. A camera control system according to claim 6, wherein said control device executes automatic control of the predetermined plurality of video cameras if the control rights of the predetermined plurality of video cameras are not issued to any of the computer terminals by said issuing device.

8. A camera control system according to claim 6, wherein said control device executes automatic control of the predetermined plurality of video cameras excluding a video camera whose control right is received, if the control rights of the predetermined plurality of video cameras are issued to one computer terminal by said issuing device.

9. A camera control system according to claim 6, wherein said control device executes automatic control of video cameras whose control rights are not received for a predetermined time period, from among the predetermined plurality of video cameras, if the control rights of the predetermined plurality of video cameras are issued to one computer terminal by said issuing device.

10. A camera control system according to claim 1, further comprising:
    a memory which stores a loci of an image pickup direction of the video camera in a memory,
    wherein said control device executes automatic control of the video camera on the basis of the loci of the image pickup direction of the video camera, which is stored in said memory.

11. A camera control system according to claim 1, further comprising:
    a memory which stores at least one image pickup direction of the video camera in a memory,
    wherein said control device executes automatic control of the video camera in the at least one image pickup direction stored in said memory.

12. A camera control system according to claim 11, wherein said memory stores an image pickup direction relative to a control position in a range in which the video camera can pick up an image.

13. A camera control system according to claim 10, wherein said storage device stores at least one of a zoom magnification, a subject distance and an on/off state of a backlight correction of the video camera, correspondingly with the image pickup direction of the video camera.

14. A camera control system according to claim 1, further comprising:
    a measuring device adapted to divide a range of a controllable image pickup direction of the video camera into a plurality of ranges and measuring a time period which elapses when the video camera is being controlled in accordance with a control command from one of the plurality of computer terminals in each of divided ranges,
    wherein said control device controls an image pickup direction of the video camera within a particular range of the plurality of divided ranges in which particular range a total of the time periods measured by said measuring device is largest.

15. A camera control system according to claim 7,
    wherein if automatic control is being executed by said control device, said video transmitting device transmits video signals from the predetermined plurality of video cameras to a computer terminal which has made the video transmission request, while changing over the video signals at intervals of a predetermined time period.

16. A camera control system according to claim 3, further comprising:
    a counting device adapted to count at least one of the number of times by which the control right has been issued to each of a predetermined plurality of video cameras by said issuing device, the number of times by which a request to acquire the control right of each of the predetermined plurality of video cameras has been received from the plurality of computer terminals, and the number of times by which said video transmitting device has transmitted a video image from each of the predetermined plurality of video cameras to the plurality of computer terminals; and a changeover device adapted to control changeover time periods of outputting of video signals of the predetermined plurality of video cameras, on the basis of the number of times counted by said counting device, wherein if automatic control is being executed by said control device, said video transmitting device changes over the video images from the predetermined plurality of video cameras on the basis of the changeover time periods controlled by said changeover device and outputs a video image to a computer terminal which has made the video transmission request.

17. A camera control system according to claim 16, wherein said changeover device controls the changeover time periods of outputting of the video signals of the predetermined plurality of video cameras in proportion to the number of times counted by said counting device.

18. A camera control system comprising:
a video camera;
a control device adapted to control the video camera;
an automatic control device adapted to start to execute automatic control of the video camera with transmitting image signals obtained by the automatic control to a computer terminal if a control command for the video camera is not received from the computer terminal for a predetermined period; and
a plurality of computer terminals for enabling said control device to output the control command for the video camera via a network.

19. A control method for a camera control system for controlling a video camera from a computer terminal via a network, said control method comprising:
a control step of controlling the video camera on the basis of a control command from the computer terminal; and
an automatic control step of starting to execute automatic control of the video camera with transmitting image signals obtained by the automatic control to the computer terminal if the control command for the video camera is not received from the computer terminal for a predetermined period.

20. A control method according to claim 19, further comprising:
a video transmitting step of transmitting a video image of the video camera in response to a request from a plurality of computer terminals,
wherein said automatic control step stops automatic control of the video camera if the video image of the video camera is not outputted by said video transmitting step.

21. A control method according to claim 19, further comprising:
an issuing step of issuing a control right of the video camera to one of a plurality of computer terminals which makes a request to acquire the control right of the video camera which is required for said control step to control the video camera,
wherein said automatic control step stops automatic control of the video camera if the control right of the video camera is not issued to any of the plurality of computer terminals by the issuing step.

22. A control method according to claim 21, wherein said automatic control step executes automatic control of the video camera if a predetermined time period elapses after the control right of the video camera is released.

23. A control method according to claim 21, further comprising:
a video transmitting step of transmitting a video image of the video camera in response to a request from each of the plurality of computer terminals,
wherein said automatic control step stops automatic control of the video camera if the video image of the video camera is not outputted by video transmitting step to any computer terminal other than the computer terminal to which the control right of the video camera is issued.

24. A control method according to claim 21, wherein said issuing step issues control rights of a predetermined plurality of video cameras to one computer terminal.

25. A control method according to claim 24, wherein said automatic control step executes automatic control of the predetermined plurality of video cameras if the control rights of the predetermined plurality of video cameras are not issued to any of the computer terminals by said issuing step.

26. A control method according to claim 24, wherein said automatic control step executes automatic control of the predetermined plurality of video cameras excluding a video camera whose control right is received, if the control rights of the predetermined plurality of video cameras are issued to one computer terminal by said issuing step.

27. A control method according to claim 24, wherein said automatic control step executes automatic control of video cameras whose control rights are not received for a predetermined time period, from among the predetermined plurality of video cameras, if the control rights of the predetermined plurality of video cameras are issued to one computer terminal by said issuing step.

28. A control method according to claim 19, further comprising:
a storage step of storing a loci of an image pickup direction of the video camera,
wherein said automatic control step executes automatic control of the video camera on the basis of the loci of the image pickup direction of the video camera, which is stored by said storage step.

29. A control method according to claim 19, further comprising:
a storage step of storing at least one image pickup direction of the video camera,
wherein said automatic control step executes automatic control of the video camera in the at least one image pickup direction stored by said storage step.

30. A control method according to claim 29, wherein said storage step stores an image pickup direction relative to a central position in a range in which the video camera can pick up an image.

31. A control method according to claim 28 or 29, wherein said storage step stores at least one of a zoom magnification, a subject distance and an on/off state of a backlight correction of the video camera, correspondingly with the image pickup direction of the video camera.

32. A control method according to claim 19, further comprising:
a measuring step of dividing a range of a controllable image pickup direction of the video camera into a plurality of ranges and measuring a time period which elapses when the video camera is being controlled in accordance with a control command from one of the plurality of computer terminals in each of the plurality of divided ranges,
wherein said automatic control step controls an image pickup direction of the video camera within a particular range of the plurality of divided ranges in which particular range a total of the time periods measured by said measuring step is largest.

33. A control method according to claim 25, further comprising:

a video transmitting step of transmitting a video image of the video camera in response to a video transmission request from each of the plurality of computer terminals, wherein if automatic control is being executed by said automatic control step, said video transmitting step transmits video signals from the predetermined plurality of video cameras to a computer terminal which has made the video transmission request, while changing over the video signals at intervals of a predetermined time period.

34. A camera control system according to claim 21, further comprising:

a video transmitting step of transmitting a video image of the video camera in response to a video transmission request from each of the plurality of computer terminals;

a counting step of counting at least one of the number of times by which the control right has been issued to each of a predetermined plurality of video cameras by said issuing step, the number of times by which a request to acquire the control right of each of the predetermined plurality of video cameras has been received from the plurality of computer terminals, and the number of times by which said video transmitting step has transmitted a video image from each of the predetermined plurality of video cameras to the plurality of computer terminals; and a changeover step of controlling changeover time periods of outputting of video signals of the predetermined plurality of video cameras, on the basis of the number of times counted by said counting step, wherein if automatic control is being executed by said automatic control step, said video transmitting step changes over the video images from the predetermined plurality of video cameras on the basis of the changeover time periods controlled by said changeover step and outputs a video image to a computer terminal which has made the video transmission request.

35. A control method according to claim 34, wherein said changeover step controls the changeover time periods of outputting of the video signals of the predetermined plurality of video cameras in proportion to the number of times counted by said counting step.

36. A storage medium which stores therein a program for executing control over a camera control system for controlling a video camera from a computer terminal via a network, said program comprising processes of:

controlling the video camera on the basis of a control command from the computer terminal; and starting to execute automatic control of the video camera with transmitting image signals obtained by the automatic control to the computer terminal if the control command for the video camera is not received from the computer terminal for a predetermined period.

37. A storage medium according to claim 36, wherein said program further comprises processes of:

transmitting a video image of the video camera in response to a request from a plurality of computer terminals, and stopping automatic control of the video camera if the video image of the video camera is not outputted.

38. A storage medium according to claim 36, wherein said program further comprises processes of:

issuing a control right of the video camera to one of a plurality of computer terminals which makes a request to acquire the control right of the video camera which is required to control the video camera; and executing automatic control of the video camera if the control right of the video camera is not issued to any of the plurality of computer terminals.

39. A storage medium according to claim 38, wherein said program further comprises a process of executing automatic control of the video camera if a predetermined time period elapses after the control right of the video camera is released.

40. A storage medium according to claim 38, wherein said program further comprises processes of:

transmitting a video image of the video camera in response to a request from each of the plurality of computer terminals; and stopping automatic control of the video camera if the video image of the video camera is not outputted to any computer terminal other than the computer terminal to which the control right of the video camera is issued.

41. A storage medium according to claim 38, wherein said program further comprises a process of issuing control rights of a predetermined plurality of video cameras to one computer terminal.

42. A storage medium according to claim 41, wherein said program further comprises a process of executing automatic control of the predetermined plurality of video cameras if the control rights of the predetermined plurality of video cameras are not issued to any of the computer terminals.

43. A storage medium according to claim 41, wherein said program further comprises a process of executing automatic control of the predetermined plurality of video cameras excluding a video camera whose control right is received, if the control rights of the predetermined plurality of video cameras are issued to one computer terminal.

44. A storage medium according to claim 41, wherein said program further comprises a process of executing automatic control of video cameras whose control rights are not received for a predetermined time period, from among the predetermined plurality of video cameras, if the control rights of the predetermined plurality of video cameras are issued to one computer terminal.

45. A storage medium according to claim 36, wherein said program further comprises processes of storing a loci of an image pickup direction of the video camera, and executing automatic control of the video camera on the basis of the loci of the image pickup direction of the video camera which is stored.

46. A storage medium according to claim 36, wherein said program further comprises processes of storing at least one image pickup direction of the video camera, and executing automatic control of the video camera in the stored at least one image pickup direction.

47. A storage medium according to claim 46, wherein said program further comprises a process of storing an image pickup direction relative to a central position in a range in which the video camera can pick up an image.

48. A storage medium according to claim 45 or 46, wherein said program further comprises a process of storing at least one of a zoom magnification, a subject distance and an on/off state of a backlight correction of the video camera, correspondingly with the image pickup direction of the video camera.

49. A storage medium according to claim 36, wherein said program further comprises processes of dividing a range of a controllable image pickup direction of the video camera into a plurality of ranges and measuring a time period which elapses when the video camera is being controlled in accordance with a control command from one of the plurality of computer terminals in each of the plurality of divided ranges, and controlling an image pickup direction of the video camera within a particular range of the plurality of divided ranges in which particular range a total of the measured time periods is largest.

50. A storage medium according to claim 42, wherein said program further comprises processes of transmitting a video image of the video camera in response to a video transmission request from each of the plurality of computer terminals, and, if automatic control is being executed, transmitting video signals from the predetermined plurality of video cameras to a computer terminal which has made the video transmission request, while changing over the video signals at intervals of a predetermined time period.

51. A storage medium according to claim 38, wherein said program further comprises processes of:
   transmitting a video image of the video camera in response to a video transmission request from each of the plurality of computer terminals;
   counting at least one of the number of times by which the control right has been issued to each of a predetermined plurality of video cameras, the number of times by which a request to acquire the control right of each of the predetermined plurality of video cameras has been received from the plurality of computer terminals, and the number of times by which a video image has been transmitted from each of the predetermined plurality of video cameras to the plurality of computer terminals;
   controlling changeover time periods of outputting of video signals of the predetermined plurality of video cameras, on the basis of the counted number of times; and
   if automatic control is being executed, changing over the video images from the predetermined plurality of video cameras on the basis of the controlled changeover time periods and outputting a video image to a computer terminal which has made the video transmission requests.

52. A storage medium according to claim 51, wherein said program further comprises a process of controlling the changeover time periods of outputting of the video signals of the predetermined plurality of video cameras in proportion to the counted number of times.

53. A camera control apparatus for controlling a video camera in accordance with a control command from a computer terminal via a network, comprising:
   a control device adapted to control the video camera on the basis of a control command from the computer terminal; and
   an issuing device adapted to issue a control right of the video camera which is required for said computer terminal to control the video camera, to the computer terminal, wherein if the control right of the video camera is not issued to the computer terminal by said issuing device for a predetermined period, after the predetermined period elapses, said control device executes automatic control of the video camera, and if the control right is issued to the computer terminal, said control device does lot execute the automatic control of the video camera.

54. A camera control apparatus according to claim 53, wherein said control device executes automatic control of the video camera if a predetermined time period elapses after the control right of the video camera is released.

55. A camera control apparatus according to claim 53, further comprising:
   a video transmitting device adapted to transmit image signals obtained by the video camera;
   wherein said control device executes automatic control of the video camera and said video transmitting device transmits the image signals of the controlled camera, if the control right of the video camera is not issued to the computer terminal by said issuing device for the predetermined period.

56. A camera control apparatus according to claim 53, wherein said issuing device issues the control right of the video camera to one of a plurality of computer terminals which makes a request to request to acquire the control right of the video camera which is required for said control device to control the video camera, and
   said control device executes automatic control of the video camera if the control right of the video camera is not issued to any of the plurality of computer terminals by said issuing device for the predetermined period.

57. A camera control apparatus according to claim 53, further comprising:
   a memory which stores a loci of an image pickup direction of the video camera in a memory,
   wherein said control device executes automatic control of the video camera on the basis of the loci of the image pickup direction of the video camera, which is stored in said memory.

58. A camera control apparatus according to claim 53, further comprising:
   a memory which stores at least one image pickup direction of the video camera in a memory,
   wherein said control device executes automatic control of the video camera in the at least one image pickup direction stored in said memory.

59. A camera control apparatus according to claim 58, wherein the image pickup direction is a central position within the controllable image pickup range of the video camera.

60. A camera control method for controlling a video camera in accordance with a control command from a computer terminal via a network, comprising:
   a control step of controlling the video camera on the basis of a control command from the computer terminal; and
   an automatic control step of, if the control right of the video camera is not issued to the computer terminal for a predetermined period, after the predetermined period elapses, executing automatic control of the video camera, and if the control right is issued to the computer terminal, not executing the automatic control of the video camera.

61. A camera control method according to claim 60, wherein said automatic control step executes automatic control of the video camera if a predetermined time period elapses after the control right of the video camera is released.

62. A camera control method according to claim 60, further comprising:
   a video transmitting step of transmitting image signals obtained by the video camera;
   wherein said automatic control step executes automatic control of the video camera and said video transmitting step transmits the image signals of the controlled camera, if the control right of the video camera is not issued to the computer terminal for the predetermined period.

63. A camera control method according to claim 60, wherein said control step controls the video camera on the basis of a control command from one of a plurality of computer terminals, and said automatic control step executes automatic control of the video camera if the control right of the video camera is not issued to any of the plurality of computer terminals for the predetermined period.

64. A camera control apparatus according to claim 60, wherein said automatic control step executes automatic control of the video camera on the basis of a loci of the image pickup direction of the video camera, which is stored in a memory.

65. A camera control method according to claim 60, wherein said automatic control step executes automatic control of the video camera in the at least one image pickup direction stored in a memory.

66. A camera control method according to claim 65, wherein the image pickup direction is a central position within the controllable image pickup range of the video camera.

67. A storage medium which stores therein a program for executing a camera control method for controlling a video camera in accordance with a control command from a computer terminal via a network, said program comprising the processes of:

controlling the video camera on the basis of a control command from the computer terminal; and if the control right of the video camera is not issued to the computer terminal for a predetermined period, after the predetermined period elapses, executing automatic control of the video camera, and if the control right is issued to the computer terminal, not executing the automatic control of the video camera.

68. A camera control apparatus for controlling a video camera in accordance with a control command from a computer terminal via a network, comprising:

a control device adapted to control the video camera on the basis of a control command from the computer terminal; and an issuing device adapted to issue a control right of the video camera which is required for said computer terminal to control the video camera, to the computer terminal, wherein, if the control right of the video camera is not issued to the computer terminal by said issuing device, said control device executes automatic control of the video camera, and if the control right is issued to the computer terminal, said control device does not execute the automatic control of the video camera and controls the video camera on the basis of the control command from the computer terminal.

69. A control apparatus according to claim 68, further comprising:

a video transmitting device adapted to transmit image signals obtained by the video camera;

wherein said control device executes automatic control of the video camera and said video transmitting device transmits the image signals of the controlled camera, if the control right of the video camera is not issued to the computer terminal by said issuing device.

70. A camera control apparatus according to claim 68, wherein said issuing device issues the control right of the video camera to one of a plurality of computer terminals which makes a request to request to acquire the control right of the video camera which is required for said control device to control the video camera, and said control device executes automatic control of the video camera if the control right of the video camera is not issued to any of the plurality of computer terminals by said issuing device.

71. A camera control apparatus according to claim 68, further comprising:

a memory which stores a loci of an image pickup direction of the video camera in a memory, wherein said control device executes automatic control of the video camera on the basis of the loci of the image pickup direction of the video camera, which is stored in said memory.

72. A camera control apparatus according to claim 68, further comprising:

a memory which stores at least one image pickup direction of the video camera in a memory, wherein said control device executes automatic control of the video camera in the at least one image pickup direction stored in said memory.

73. A camera control apparatus according to claim 72, wherein the image pickup direction is a central position within the controllable image pickup range of the video camera.

74. A camera control method for controlling a video camera in accordance with a control command from a computer terminal via a network, comprising:

a control step of controlling the video camera on the basis of a control command from the computer terminal; and an automatic control step of, if the control right of the video camera is not issued to the computer terminal by an issuing device, executing automatic control of the video camera, and if the control right is issued to the computer terminal, not executing the automatic control of the video camera and controlling the video camera on the basis of the control command from the computer terminal.

75. A camera control method according to claim 74, further comprising:

a video transmitting step of transmitting image signals obtained by the video camera;

wherein said control device executes automatic control of the video camera and said video transmitting step transmits the image signals of the controlled camera, if the control right of the video camera is not issued to the computer terminal by said issuing device.

76. A camera control method according to claim 74, wherein said control step controls the video camera on the basis of a control command from one of a plurality of computer terminals, and said automatic control step executes automatic control of the video camera if the control right of the video camera is not issued to any of the plurality of computer terminals.

77. A camera control method according to claim 74, wherein said automatic control step executes automatic control of the video camera on the basis of a loci of the image pickup direction of the video camera, which is stored in a memory.

78. A camera control method according to claim 74, wherein said automatic control step executes automatic control of the video camera in the at least one image pickup direction stored in a memory.

79. A camera control method according to claim 78, wherein the image pickup direction is a central position within the controllable image pickup range of the video camera.

80. A storage medium which stores therein a program for executing a camera control method for controlling a video camera in accordance with a control command from a computer terminal via a network, said program comprising the process of:

controlling the video camera on the basis of a control command from the computer terminal; and if the control right of the video camera is not issued to the computer terminal by an issuing device, executing automatic control of the video camera, and if the control right is issued to the computer terminal, not executing the automatic control of the video camera and controlling the video camera on the basis of the control command from the computer terminal.

81. A camera control apparatus for controlling a video camera from a computer terminal via a network comprising:

a control device adapted to control the video camera on the basis of a control command from the computer terminal;

an issuing device adapted to issue a control right of the video camera which is required for said computer terminal to control the video camera, to the computer terminal; and a releasing device adapted to release the control right required by said computer terminal, wherein, if a predetermined period elapses after the control right of the video camera is released by said releasing device, said control device executes automatic control of the video camera, and if a predetermined period does not elapse after the control right of the video camera is released, said control device does not execute the automatic control of the video camera.

82. A control apparatus according to claim 81, further comprising:

a video transmitting device adapted to transmit image signals obtained by the video camera;

wherein said control device executes automatic control of the video camera and said video transmitting device transmits the image signals of the controlled camera, if a predetermined period elapses after the control right of the video camera is released by said releasing device.

83. A camera control apparatus according to claim 81, wherein said issuing device issues the control right of the video camera to one of a plurality of computer terminals which makes a request to request to acquire the control right of the video camera which is required for said control device to control the video camera, and said control device executes automatic control of the video camera if a predetermined period elapses after all of the control right required by the plurality of computer terminals are released by said releasing device.

84. A camera control apparatus according to claim 81, further comprising:

a memory which stores a loci of an image pickup direction of the video camera in a memory, wherein said control device executes automatic control of the video camera on the basis of the loci of the image pickup direction of the camera, which is stored in said memory.

85. A camera control apparatus according to claim 81, further comprising:

a memory which stores at least one image pickup direction of the video camera in a memory, wherein said control device executes automatic control of the video camera in the at least one image pickup direction stored in said memory.

86. A camera control apparatus according to claim 85, wherein the image pickup direction is a central position within the controllable image pickup range of the video camera.

87. A camera control method for controlling a video camera from a computer terminal via a network, comprising:

a control step of controlling the video camera on the basis of a control command from the computer terminal; and an automatic control step of, if a predetermined period elapses after the control right of the video camera is released, executing automatic control of the video camera, and if a predetermined period does not elapse after the control right of the video camera is released, not executing automatic control of the video cameral.

88. A control method according to claim 87, further comprising:

a video transmitting step of transmitting image signals obtained by the video camera;

wherein said automatic control step executes automatic control of the video camera and said video transmitting step transmits the image signals of the controlled camera, if a predetermined period elaPses after the control right of the video camera is released.

89. A camera control method according to claim 87, wherein said control step controls the video camera on the basis of a control command from one of a plurality of computer terminals, and said automatic control step executes automatic control of the video camera if a predetermined period elapses after all of the control right required by the plurality of computer terminals are released.

90. A camera control method according to claim 87, wherein said automatic control step executes automatic control of the video camera on the basis of a loci of the image pickup direction of the video camera, which is stored in a memory.

91. A camera control method according to claim 87, wherein said automatic control step executes automatic control of the video camera in the at least one image pickup direction stored in a memory.

92. A camera control method according to claim 91, wherein the image pickup direction is a central position within the controllable image pickup range of the video camera.

93. A storage medium which stores therein a program for executing a camera control method for controlling a video camera in accordance with a control command from a computer terminal via a network, said program comprising the processes of:

controlling the video camera on the basis of a control command from the computer terminal; and if a predetermined period elapses after the control right of the video camera is released, executing automatic control of the video camera, and if a predetermined period does not elapse after the control right of the video camera is released, not executing automatic control of the video camera.

* * * * *

UNITED STATES PATENT AND TRADEMARK OFFICE
CERTIFICATE OF CORRECTION

PATENT NO. : 7,106,364 B1 Page 1 of 1
APPLICATION NO. : 09/118754
DATED : September 12, 2006
INVENTOR(S) : Hideo Noro It is certified that error appears in the above-identified patent and that said Letters Patent is hereby corrected as shown below:

Column 8, line 59, delete "302$a$ to 302" and insert -- 302$a$ to 302$e$ --

Column 9, line 42, delete "Step 5301" and insert -- Step S301 --

Column 30, line 30, delete "period elaPses" and insert -- period elapses --

Signed and Sealed this

Fourth Day of September, 2007

JON W. DUDAS
*Director of the United States Patent and Trademark Office*